United States Patent
Kim et al.

(10) Patent No.: US 12,038,815 B2
(45) Date of Patent: Jul. 16, 2024

(54) ELECTRONIC DEVICE AND OPERATION METHOD THEREOF

(71) Applicant: Samsung Electronics Co., Ltd., Suwon-si (KR)

(72) Inventors: Eunkyung Kim, Suwon-si (KR); Sangheon Kim, Suwon-si (KR); Jooyoung Jeon, Suwon-si (KR); Youngjin Cho, Suwon-si (KR); Sehwan Kim, Suwon-si (KR); Jeonghui Yun, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 17/930,375

(22) Filed: Sep. 7, 2022

(65) Prior Publication Data
US 2023/0049967 A1 Feb. 16, 2023

Related U.S. Application Data

(63) Continuation of application No. PCT/KR2022/011944, filed on Aug. 10, 2022.

(30) Foreign Application Priority Data

Aug. 10, 2021 (KR) .................. 10-2021-0105500

(51) Int. Cl.
*G06F 9/44* (2018.01)
*G06F 9/445* (2018.01)
(Continued)

(52) U.S. Cl.
CPC ...... *G06F 11/1464* (2013.01); *G06F 9/44505* (2013.01); *G06F 11/1469* (2013.01); *G06F 11/324* (2013.01)

(58) Field of Classification Search
CPC ..................................... G06F 1/32; G06F 9/44
See application file for complete search history.

(56) References Cited

U.S. PATENT DOCUMENTS 8,868,859 B2 10/2014 Schmidt et al.
9,483,365 B2 11/2016 Schmidt et al.
(Continued)

FOREIGN PATENT DOCUMENTS

JP 2012-252701 A 12/2012
JP 2017-028659 A 2/2017
(Continued)

OTHER PUBLICATIONS

International Search Report dated Dec. 12, 2022 in connection with International Patent Application No. PCT/KR2022/011944, 2 pages.

*Primary Examiner* — Keshab R Pandey

(57) ABSTRACT

An electronic device includes a display, a memory, and a processor operatively connected to the display and the memory. The memory stores instructions that, when executed, cause the processor to receive backup data from an external electronic device, identify characteristics of the external electronic device based on the backup data, identify characteristics of the electronic device based on the backup data, at least partially change the backup data based on the characteristics of the electronic device, and display a result of performing a restoring operation based on the at least partially changed backup data on the display.

20 Claims, 20 Drawing Sheets

(51) Int. Cl.
*G06F 11/14* (2006.01)
*G06F 11/32* (2006.01)

(56) References Cited

U.S. PATENT DOCUMENTS

| | | | |
|---|---|---|---|
| 9,690,560 | B2 | 6/2017 | Dharawat et al. |
| 9,864,563 | B2 | 1/2018 | Imai et al. |
| 10,430,283 | B1* | 10/2019 | Chopra ............... G06F 11/1451 |
| 10,963,209 | B2 | 3/2021 | Shim |
| 2009/0307333 | A1* | 12/2009 | Welingkar .......... H04L 67/1095 |
| | | | 455/414.3 |
| 2012/0311279 | A1 | 12/2012 | Hong et al. |
| 2013/0238889 | A1 | 9/2013 | Fernandez et al. |
| 2014/0203999 | A1 | 7/2014 | Shim |
| 2015/0026644 | A1 | 1/2015 | Cho |
| 2015/0067398 | A1 | 3/2015 | Lee |
| 2015/0087288 | A1 | 3/2015 | Dharawat et al. |
| 2021/0042293 | A1* | 2/2021 | Jun ..................... G06F 11/1435 |

FOREIGN PATENT DOCUMENTS

| | | |
|---|---|---|
| JP | 6100848 B2 | 3/2017 |
| KR | 10-2014-0031366 A | 3/2014 |
| KR | 10-2014-0094082 A | 7/2014 |
| KR | 10-2016-0042739 A | 4/2016 |

\* cited by examiner

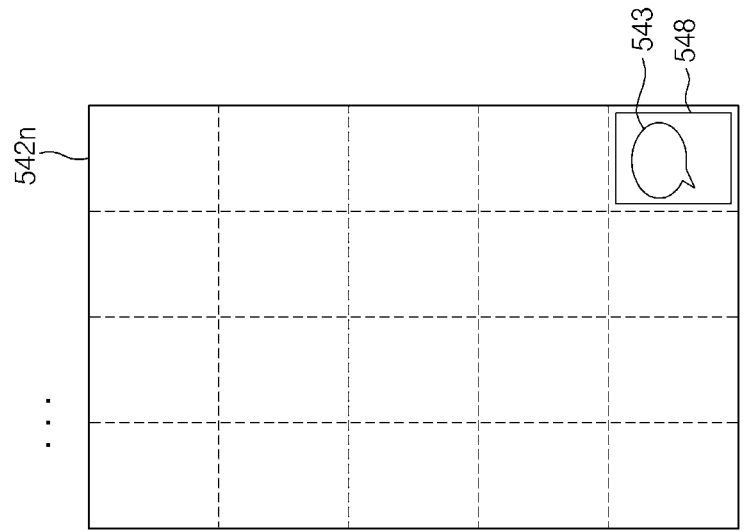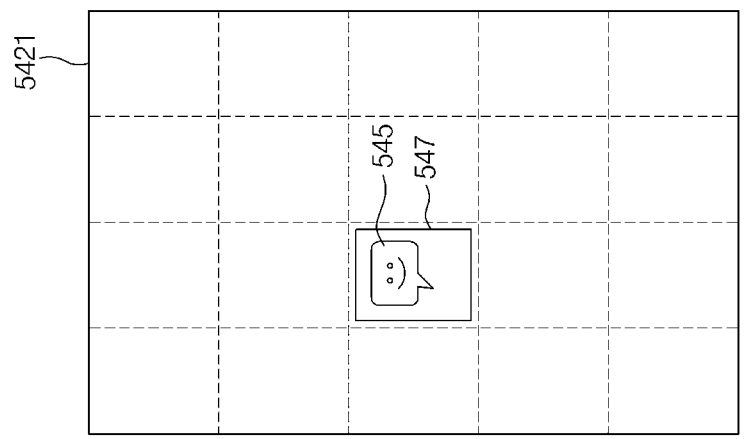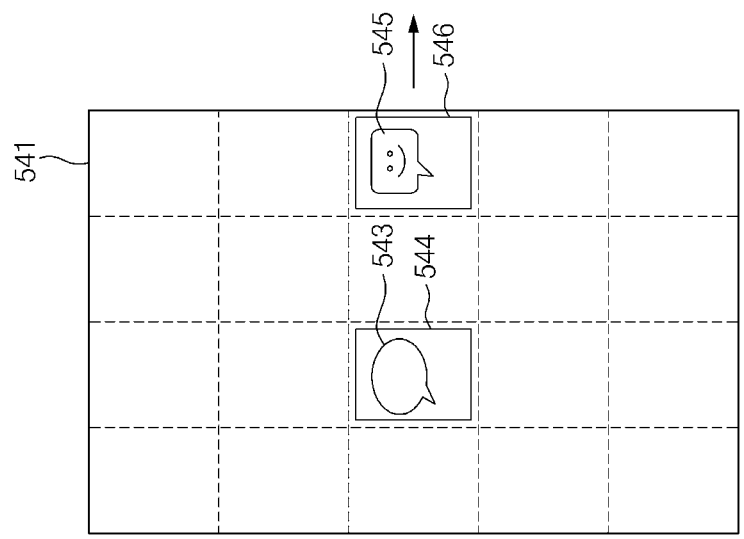
FIG.5D

ELECTRONIC DEVICE AND OPERATION METHOD THEREOF

CROSS-REFERENCE TO RELATED APPLICATIONS

This application is a Bypass Continuation of International Application No. PCT/KR2022/011944, filed Aug. 10, 2022, which claims priority to Korean Patent Application No. 10-2021-0105500, filed Aug. 10, 2021, the disclosures of which are herein incorporated by reference in their entirety.

BACKGROUND

1. Field

Various embodiments disclosed in the disclosure relate to an electronic device and an operation method of the electronic device.

2. Description of Related Art

An electronic device supports backup and restoring functions. For example, a user may restore a usage environment of a first electronic device on a second electronic device using backup data generated by backing up data stored in the first electronic device.

SUMMARY

When a restoring operation using backup data is performed regardless of characteristics of an electronic device, it may be difficult for a user to experience a new use experience provided by the electronic device.

Various embodiments disclosed in the disclosure are to provide an electronic device that performs a restoring operation based on backup data that is at least partially changed based on characteristics of the electronic device after receiving the backup data.

An electronic device includes a display, a memory, and a processor operatively connected to the display and the memory. The memory stores instructions that, when executed, cause the processor to receive backup data from an external electronic device, identify characteristics of the external electronic device based on the backup data, identify characteristics of the electronic device based on the backup data, at least partially change the backup data based on the characteristics of the electronic device, and display a result of performing a restoring operation based on the at least partially changed backup data on the display.

An operation method of an electronic device includes receiving backup data from an external electronic device, identifying characteristics of the external electronic device based on the backup data, identifying characteristics of the electronic device based on the backup data, at least partially changing the backup data based on the characteristics of the electronic device, and displaying a result of performing a restoring operation based on the at least partially changed backup data on a display of the electronic device.

Various embodiments disclosed in the disclosure are to provide the electronic device that performs the restoring operation based on the backup data that is at least partially changed based on the characteristics of the electronic device after receiving the backup data.

In addition, various effects that are directly or indirectly identified through the disclosure may be provided.

BRIEF DESCRIPTION OF THE DRAWINGS

FIG. 5D exemplarily illustrates a screen layout displayed based on data obtained by at least partially changing backup data, according to various embodiments.

FIG. 5I exemplarily illustrates a screen layout displayed based on data obtained by at least partially changing backup data, according to various embodiments.

In connection with the description of the drawings, the same or similar reference numerals may be used for the same or similar components.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
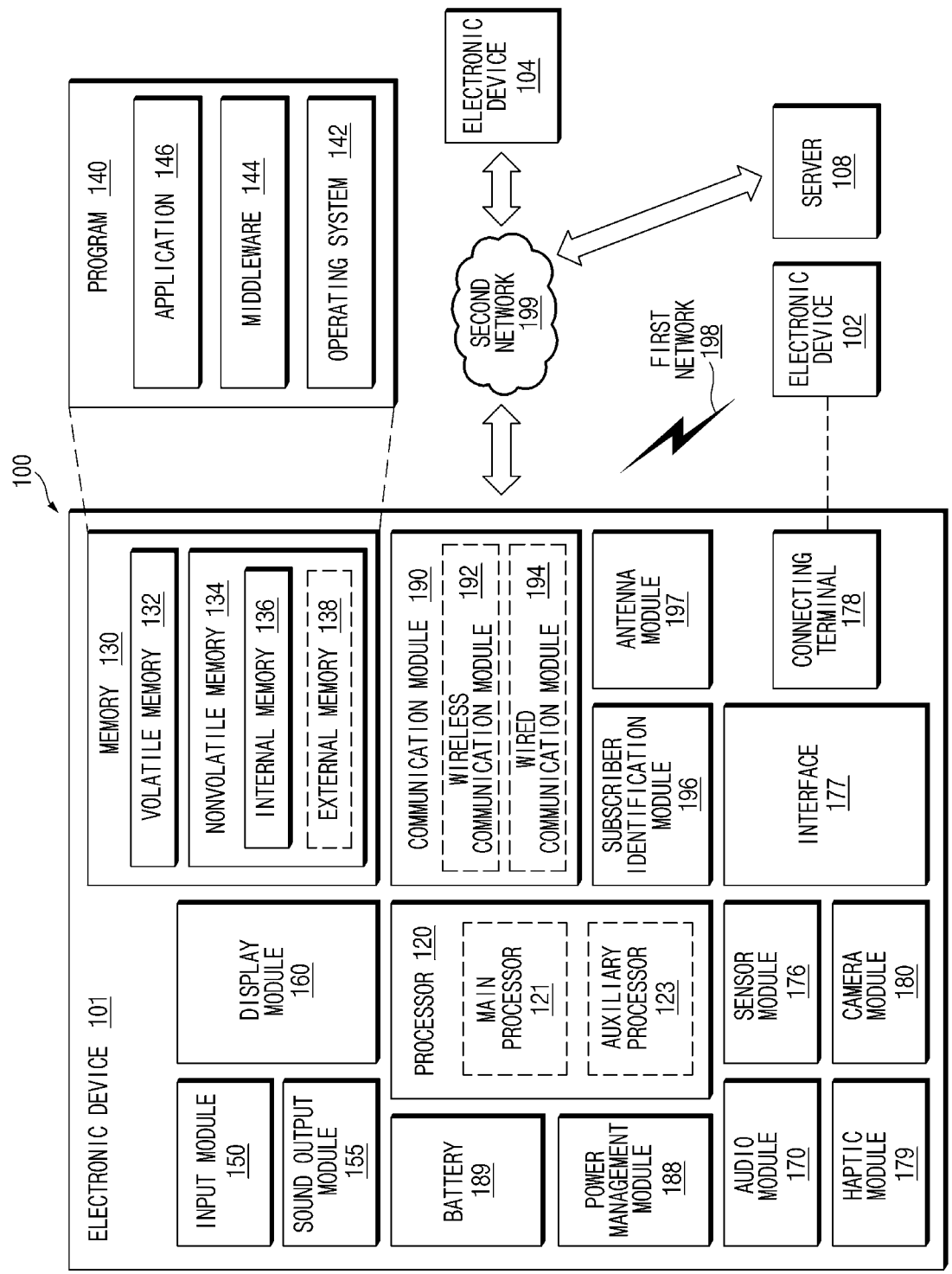
FIG. 1 illustrates a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
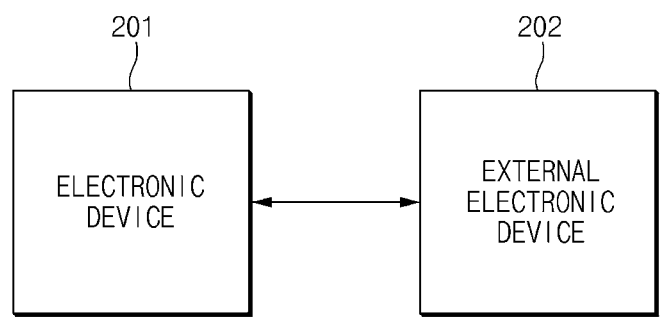
FIG. 2 illustrates an environment including an electronic device and an external electronic device, according to various embodiments.

FIG. 2 illustrates an environment including an electronic device and an external electronic device, according to various embodiments.

According to one embodiment, an electronic device 201 (e.g., the electronic device 101 in FIG. 1) may correspond to at least one of a portable communication device (e.g., a smartphone), a computer device, a portable multimedia device, and a wearable device. According to various embodiments, an external electronic device 202 (e.g., the external electronic devices 102 and 104 in FIG. 1) may correspond to at least one of a portable communication device (e.g., a smartphone), a computer device, and a portable multimedia device or a wearable device different from the electronic device 201.

According to various embodiments, the electronic device 201 may receive backup data from the external electronic device 202, and perform a restoring operation using the backup data based on characteristics of the electronic device 201.

According to various embodiments, the backup data, which is data related to the external electronic device 202, may contain information related to an application installed in the external electronic device 202 and/or information related to a screen layout of the external electronic device 202. The backup data that the electronic device 201 receives from the external electronic device 202 may be referred to as first data.

According to various embodiments, the restoring operation may correspond to an operation of setting a usage environment of the electronic device using the backup data received from the external electronic device 202. For example, the restoring operation may include an operation of installing, in the electronic device 201, an application the same as or similar to the application installed in the external electronic device 202 based on the backup data received from the external electronic device 202. For example, the restoring operation may include an operation of setting a screen layout of the electronic device 201 to be the same as or similar to the screen layout of the external electronic device 202. For example, the restoring operation may include an operation of moving at least a portion of user data stored in the external electronic device 202 to the electronic device 201. In various embodiments, the restoring operation may include various operations performed by the electronic device 201 using the backup data received from the external electronic device 202.

According to various embodiments, the information related to the screen layout may include information indicating a location where an icon corresponding to the application is disposed. In various embodiments, the information related to the screen layout may correspond to information that causes the icon corresponding to the application to be located (or displayed) at a specified location of a screen. In various embodiments, the information related to the screen layout may correspond to information that causes the icon corresponding to the application to be contained in a specified folder. In various embodiments, the information related to the screen layout may include information that causes an execution screen of the application to be located (or displayed) on a specified page (e.g., a page of a top priority) among a plurality of pages of a home screen (or the plurality of pages constituting the home screen).

According to various embodiments, the electronic device 201 may at least partially change (or modify and process) the backup data received from the external electronic device 202 based on the characteristics of the electronic device 201. According to various embodiments, the electronic device 201 may recognize information indicating the characteristics of the electronic device 201, and at least partially change the backup data received from the external electronic device 202 based on the recognized information indicating the characteristics of the electronic device 201. The at least partially changed backup data may be referred to as second data. According to various embodiments, the electronic device 201 may perform the restoring operation based on the at least partially changed backup data (e.g., the second data).

According to various embodiments, the information indicating the characteristics of the electronic device 201 may include information identifying a default application that is installed in the electronic device 201 and performs a specified function (e.g., a message transmission and reception function or a call function). According to various embodiments, the information indicating the characteristics of the electronic device 201 may include information indicating whether the electronic device 201 supports a specified function (e.g., a function of displaying an execution screen of a specified application at a specified location).

According to various embodiments, the electronic device 201 may recognize, based on the backup data, that the specified application that was installed in the external electronic device 202 is the same as a new application installed in the electronic device 201 and that was not previously installed in the electronic device 201. In this case, the electronic device 201 may dispose the new application at an existing location of the specified application based on package information of the application.

According to various embodiments, when performing the restoring operation using the backup data, the electronic device 201 may configure the screen layout based on the characteristics of the electronic device 201 or may execute the specified function (or the specified application) based on the characteristics of the electronic device 201. The electronic device 201 may receive the backup data from the external electronic device 202, and at least partially change the backup data based on the characteristics of the electronic device 201 to set a usage environment matching the characteristics of the electronic device 201. According to various embodiments, the electronic device 201 may provide a new use experience to a user of the electronic device 201 by at least partially changing the backup data.

Figure 3:
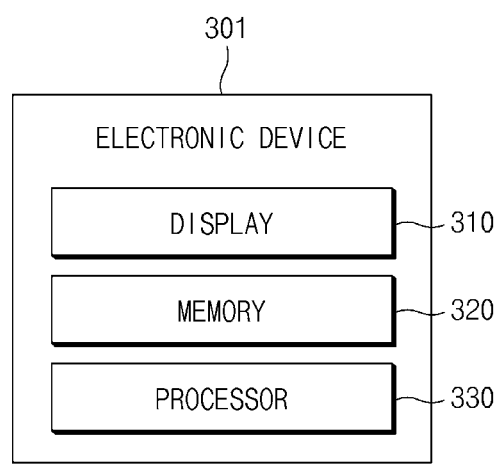
FIG. 3 illustrates a block diagram of an electronic device according to various embodiments.

FIG. 3 illustrates a block diagram of an electronic device according to various embodiments.

According to various embodiments, an electronic device 301 (e.g., the electronic device 101 in FIG. 1 or the electronic device 201 in FIG. 2) may include a display 310 (e.g., the display module 160 in FIG. 1), a memory 320 (e.g., the memory 130 in FIG. 1), and a processor 330 (e.g., the processor 120 in FIG. 1).

According to various embodiments, the electronic device 301 may perform the restoring operation based on backup data received from an external electronic device (e.g., the external electronic devices 102 and 104 in FIG. 1 or the external electronic device 202 in FIG. 2) and characteristics of the electronic device 301.

According to various embodiments, the display 310 may visually provide information to the outside (e.g., the user) of the electronic device 301. The display 310 may include, for example, a display, a hologram device, a projector, and a control circuit for controlling the corresponding device. In various embodiments, the display 310 may include a flexible display. For example, the display 310 may include a foldable (or bendable) display constructed such that at least a portion of a display region is folded.

According to various embodiments, the memory 320 may store various data (or information). According to various embodiments, the memory 320 may store at least one program, application, data, or instruction executed by the processor 330. According to various embodiments, the memory 320 may include at least some of the memory 130 shown in FIG. 1. According to various embodiments, the memory 320 may store information or an instruction that causes at least some of operations of the processor 330 (or the electronic device 301) to be described later to be performed. According to various embodiments, the memory 320 may store instructions related to a plurality of applications executed by the processor 330. According to various embodiments, the memory 320 may store information necessary for the operation of the electronic device 301.

According to various embodiments, the processor 330 may be operatively connected with other components of the electronic device 301 and control various operations of the electronic device 301. For example, the processor 330 may include an application processor of the electronic device 301. The processor 330 may perform the various operations of the electronic device 301 by executing one or more instructions stored in the memory 320. Hereinafter, operations described as being performed by the electronic device 301 may be referred to as being performed by the processor 330.

According to various embodiments, the processor 330 may receive the backup data from the external electronic device by executing a specified application. For example, the specified application may correspond to an application performing a function of moving data (e.g., the backup data) between different electronic devices. For example, the backup data may include information related to an application installed in the external electronic device. For example, the information related to the application installed in the external electronic device may include information identifying the application installed in the external electronic device. For example, the backup data may include information related to a screen layout.

According to various embodiments, the processor 330 may analyze the received backup data. According to various embodiments, the processor 330 may identify characteristics of the external electronic device based on the received backup data. According to various embodiments, the processor 330 may identify an application that is installed in the external electronic device and performs a specified function based on the backup data. According to various embodiments, the processor 330 may recognize a screen layout of the external electronic device based on the backup data. According to various embodiments, the processor 330 may determine whether the external electronic device supports the specified function based on the backup data. For example, the specified function may be a function of a specified application that displays the execution screen on an entirety of the specified page (e.g., the page of the top priority) among the plurality of pages of the home screen. Hereinafter, an example in which the processor 330 analyzes information related to the external electronic device contained in the backup data to recognize (or identify) the characteristics of the external electronic device will be described. In various embodiments, the processor 330 may recognize various information related to the external electronic device using the backup data in addition to the example to be described later.

For example, the processor 330 may identify an application that performs the message transmission and reception function of the external electronic device based on the backup data. For example, the processor 330 may identify at which location on the screen layout of the external electronic device an icon corresponding to the identified application that performs the message transmission and reception function is located.

For example, the processor 330 may identify an application that performs the call function of the external electronic device. For example, the processor 330 may identify at which location on the screen layout of the external electronic device an icon corresponding to the identified application that performs the call function of the external electronic device is located.

For example, when the external electronic device corresponds to a foldable electronic device, the processor 330 may recognize a screen layout displayed on a first display exposed to the outside in a folded state of the external electronic device (or a location of an icon constituting the screen layout displayed on the first display). The processor 330 may recognize a screen layout displayed on a second display exposed to the outside in an unfolded state of the external electronic device (or a location of an icon constituting the screen layout displayed on the second display).

For example, when the external electronic device includes the plurality of pages displayed on the home screen, the processor 330 may determine whether the specified application that is set such that the execution screen is displayed on the page of the top priority among the plurality of pages exists, and identify the corresponding specified application.

According to various embodiments, the processor 330 may identify the characteristics of the electronic device 301 based on the backup data. In various embodiments, the processor 330 may identify a default application that performs the specified function (e.g., the message transmission and reception function or the call function) and/or determine whether the specified function is supported. For example, the specified function may be the function of the specified application that displays the execution screen on the entirety of the specified page (e.g., the page of the top priority) among the plurality of pages of the home screen. For example, the processor 330 may recognize the characteristics of the electronic device 301 corresponding to the backup data received from the external electronic device.

For example, the processor 330 may identify an application that performs a message transmission and reception function of the electronic device 301 corresponding to the application that performs the message transmission and reception function of the external electronic device identified based on the backup data.

For example, the processor 330 may identify an application that performs a call function of the electronic device 301 corresponding to the application that performs the call function of the external electronic device identified based on the backup data.

For example, the processor 330 may identify a specified application that is set such that an execution screen is displayed on a specified page (e.g., a page of the top priority) among a plurality of pages displayed on a home screen of the electronic device 301.

According to various embodiments, the processor 330 may at least partially change (or modify and process) the backup data based on the recognized characteristics of the electronic device 301. According to various embodiments, the processor 330 may display a result of performing the restoring operation by at least partially changing the backup data based on the characteristics of the electronic device 301 on the display 310.

In various embodiments, the application that performs the specified function (e.g., the message transmission and reception function or the call function) of the external electronic device may be different from the application that performs the specified function of the electronic device 301. For example, the message transmission and reception function of the external electronic device may be performed by a first application, and the message transmission and reception function of the electronic device 301 may be performed by a second application. The processor 330 may configure a screen layout that is the same as or similar to the screen layout of the external electronic device, and may at least partially change the backup data such that an icon of the second application is displayed at a location of an icon of the first application by replacing the icon of the first application.

In various embodiments, in the external electronic device, the specified application that is set such that the execution screen is displayed on the entirety of the specified page (e.g., the page of the top priority) among the plurality of pages of the home screen may not exist or the specified application may be in a deactivated state. In another example, a first specified application set such that an execution screen is displayed on the entirety of the specified page (e.g., the page of the top priority) of the home screen of the external electronic device and a second specified application set such that an execution screen is displayed on the entirety of the specified page of the home screen of the electronic device 301 may be different from each other. For example, the application set such that the execution screen is displayed on the entirety of the specified page of the external electronic device may correspond to a third application, and the application set such that the execution screen is displayed on the entirety of the specified page of the electronic device 301 may correspond to a fourth application. In various embodiments, the processor 330 may at least partially change the backup data to display the execution screen of the fourth application by replacing the execution screen of the third application on the entirety of the page of the top priority of the home screen of the electronic device 301.

According to various embodiments, the processor 330 may perform the restoring operation based on the at least partially changed backup data. For example, during the restoring operation after backing up the data of the external electronic device, the processor 330 may configure the screen layout such that a user of the electronic device 301 is able to easily recognize the application determined based on the characteristics of the electronic device 301. For example, during the restoring operation after backing up the data of the external electronic device, the processor 330 may display the execution screen of the application (e.g., the fourth application) determined based on the characteristics of the electronic device 301 on the specified page to configure the screen layout such that the user of the electronic device 301 may easily recognize the execution screen of the application. In various embodiments, in the restoring operation after backing up the data, the processor 330 may provide a new use experience based on the characteristics of the electronic device 301 to the user by configuring and displaying the screen layout based on the characteristics of the electronic device 301. With reference to following drawings, the restoring operation based on the characteristics of the electronic device 301 according to various embodiments will be described.

Figure 4A:
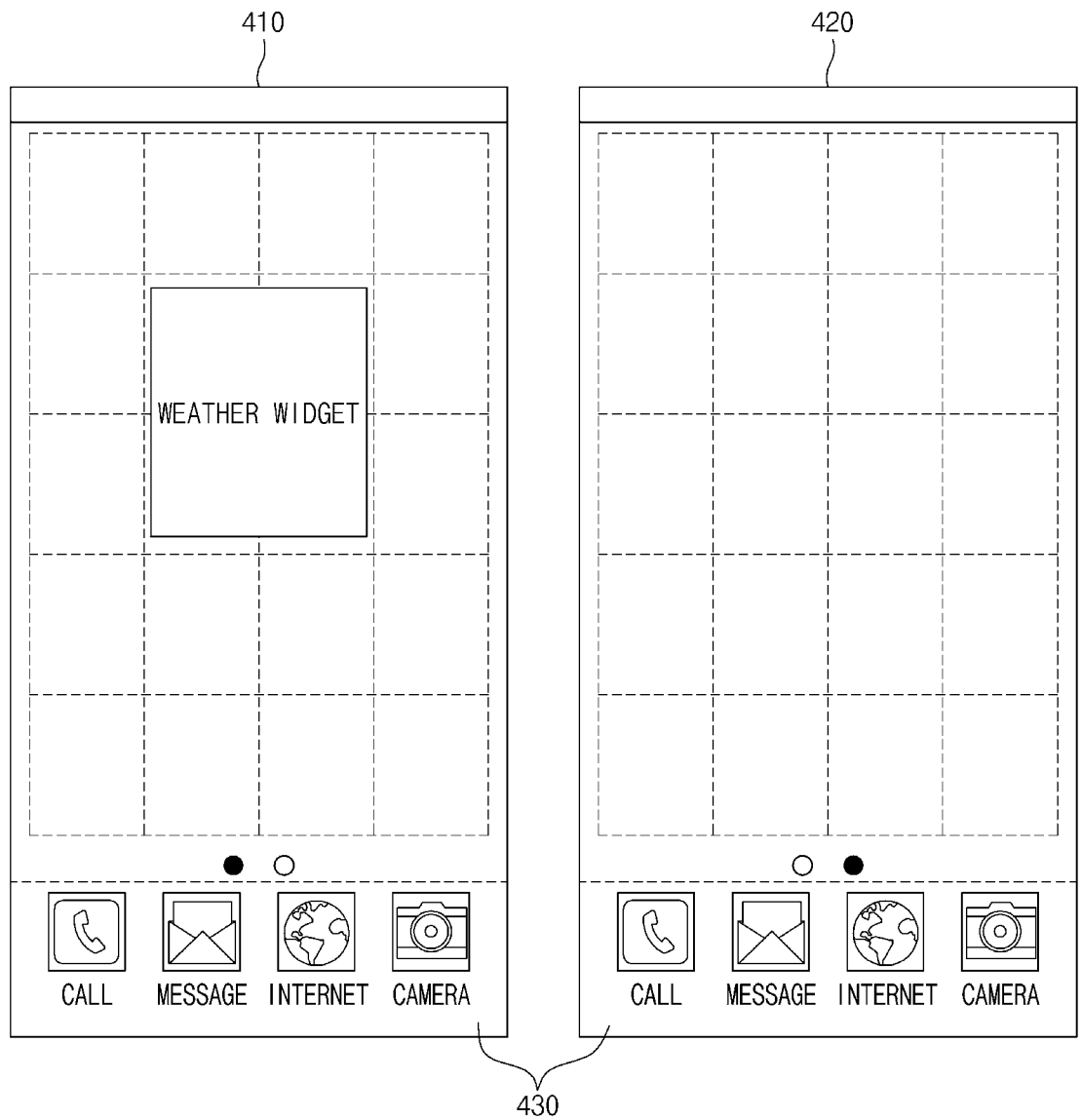
FIGS. 4A and 4B exemplarily illustrate a screen layout of an electronic device, according to various embodiments.
Figure 4B:
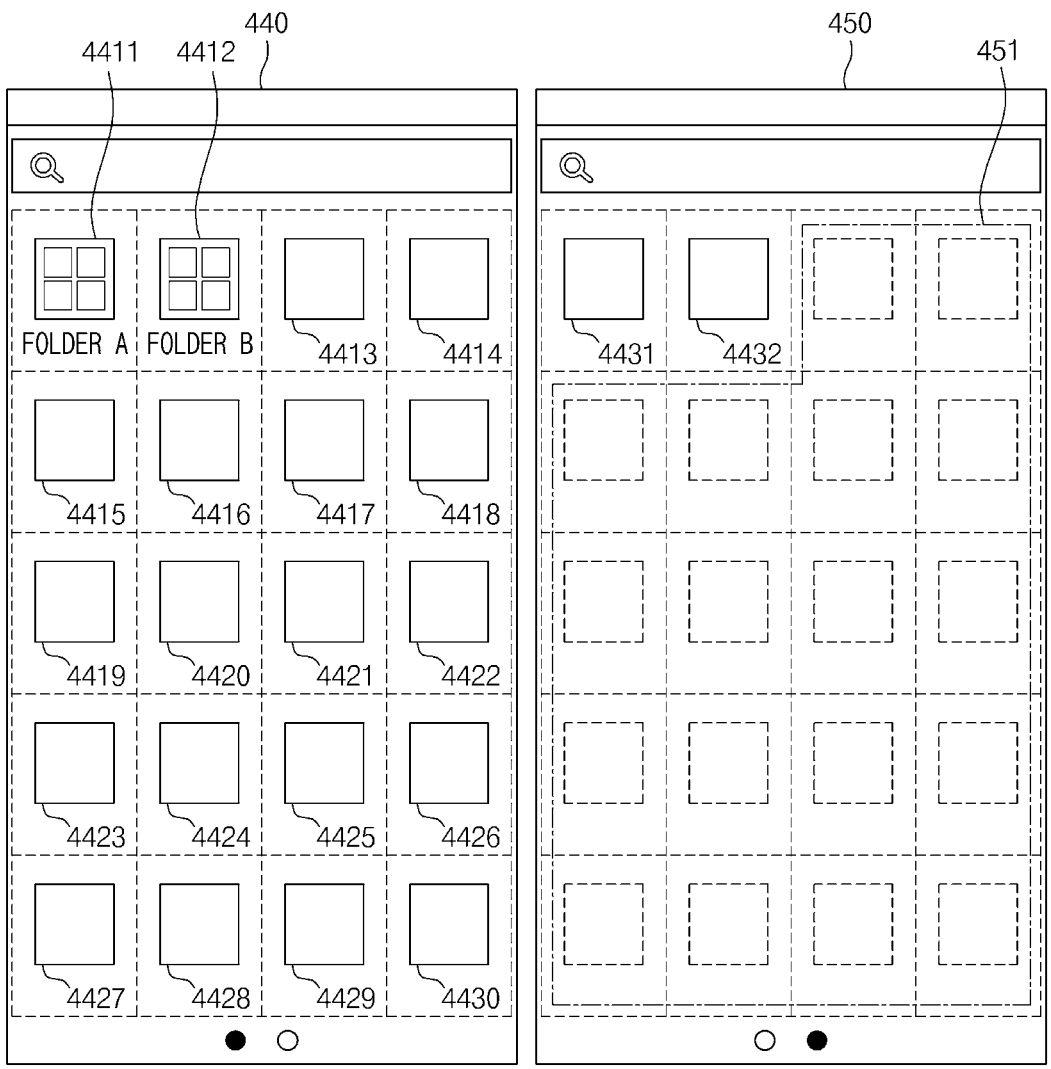

FIGS. 4A and 4B exemplarily illustrate a screen layout of an electronic device, according to various embodiments.

FIG. 4A illustrates a plurality of pages 410 and 420 of a home screen of an electronic device (e.g., the electronic device 101 in FIG. 1, the electronic device 201 in FIG. 2, or the electronic device 301 in FIG. 3), according to various embodiments. For example, the home screen of the electronic device may contain the first page 410, the second page 420, and a region 430 that does not change when the page is changed and displays an icon in a fixed manner.

FIG. 4B illustrates a plurality of pages 440 and 450 of an application drawer screen of the electronic device according to an embodiment. For example, the application drawer screen of the electronic device may include the first page 440 and the second page 450. Referring to the first page 440 of the application drawer screen, icons indicating various applications may be arranged (or located) in a specified arrangement. For example, the application icons may be located in a 5×4 array. In various embodiments, the application icons may be located sequentially 4411, 4412, 4413, 4414, . . . , 4431, and 4432 from an upper left end 4411 based on an order installed in the electronic device. Referring to the second page 450 of the application drawer screen, a region 451 in which the application icon does not exist may be displayed in an empty state. According to various embodiments, the application icons may be arranged to be contained in a specified folder (e.g., a folder A and/or a folder B). Referring to the second page 450 of the application drawer, the region 451 in which the application icon does not exist may be displayed in the empty state.

According to various embodiments, the electronic device may analyze backup data received from an external electronic device (e.g., the external electronic devices 102 and 104 in FIG. 1 or the external electronic device 202 in FIG. 2).

In various embodiments, the backup data may contain information related to an application installed in the external electronic device. For example, the information related to the application installed in the external electronic device may include information identifying the application installed in the external electronic device.

In various embodiments, the backup data may contain information related to a screen layout. For example, the information related to the screen layout may include location information indicating a location of an icon of the application installed in the external electronic device. For example, the information related to the screen layout may include location information indicating at which location on a home screen the icon of the application installed in the external electronic device is located and/or location information indicating at which location on the drawer screen of the application the icon of the application installed in the external electronic device is located. For example, when the application installed in the external electronic device supports a widget function, the information related to the screen layout may include size information indicating a size of the widget and/or location information indicating a location of the widget. For example, the information related to the screen layout may indicate whether the icon of the application installed in the external electronic device is contained in a specified folder. The above-described location information may be implemented using coordinate values along a first axis (e.g., an x-axis) and a second axis (e.g., a y-axis) substantially perpendicular to the first axis.

In various embodiments, the electronic device may identify a specified application installed in the external electronic device based on the backup data. The electronic device may recognize that information related to the specified application is at least partially updated when the specified application is installed in the electronic device during the restoring operation. For example, a version of the specified application may be changed during the restoring operation. For example, the information related to the specified application contained in the backup data may include a package name of the specified application and a class name of the specified application. According to various embodiments, when the specified application is updated such that at least one of the package name and the class name of the specified application is changed during the restoring operation, the electronic device may dispose an icon of the specified application at the same location on the screen layout of the external electronic device. For example, when the information of the specified application is at least partially changed during the restoring operation, the electronic device may dispose the icon of the specified application at the same location as the location on the screen layout of the external electronic device.

In various embodiments, the electronic device may display a result of performing the restoring operation by at least partially changing the backup data received from the external electronic device based on the backup data received from the external electronic device and characteristics of the electronic device. In various embodiments, the electronic device may determine a location of the icon of the application during the restoring operation based on the backup data received from the external electronic device and the characteristics of the electronic device. In various embodiments, during the restoring operation, the electronic device may at least partially change the backup data such that a user may easily access the specified application based on the characteristics of the electronic device, and perform the restoring operation based on the at least partially changed backup data. In various embodiments, the electronic device may determine a priority of the application based on the backup data received from the external electronic device and the characteristics of the electronic device, and determine the location of the icon of the application based on the determined priority. An embodiment in which the electronic device determines the location of the icon of the application during the restoring operation will be described with reference to FIGS. 5A to 5I and FIGS. 6A to 6B below. In various embodiments, the electronic device may configure a screen layout of each of a plurality of displays of a foldable electronic device during the restoring operation based on the backup data received from the external electronic device and the characteristics of the electronic device. An embodiment in which the electronic device configures the screen layout of each of the plurality of displays during the restoring operation will be described with reference to FIG. 7 below.

In various embodiments, during the restoring operation, the electronic device may display an execution screen of the specified application on an entirety of a specified location (e.g., a page of a top priority) among the plurality of pages of the home screen based on the backup data received from the external electronic device and the characteristics of the electronic device. In various embodiments, the electronic device may at least partially change the backup data such that the user may easily access the specified application that performs a specified function based on the characteristics of the electronic device during the restoring operation, and perform the restoring operation based on the at least partially changed backup data. An embodiment in which the electronic device displays the execution screen of the specified application on the specified page of the home screen during the restoring operation will be described with reference to FIGS. 8A and 8B below.

Figure 5A:
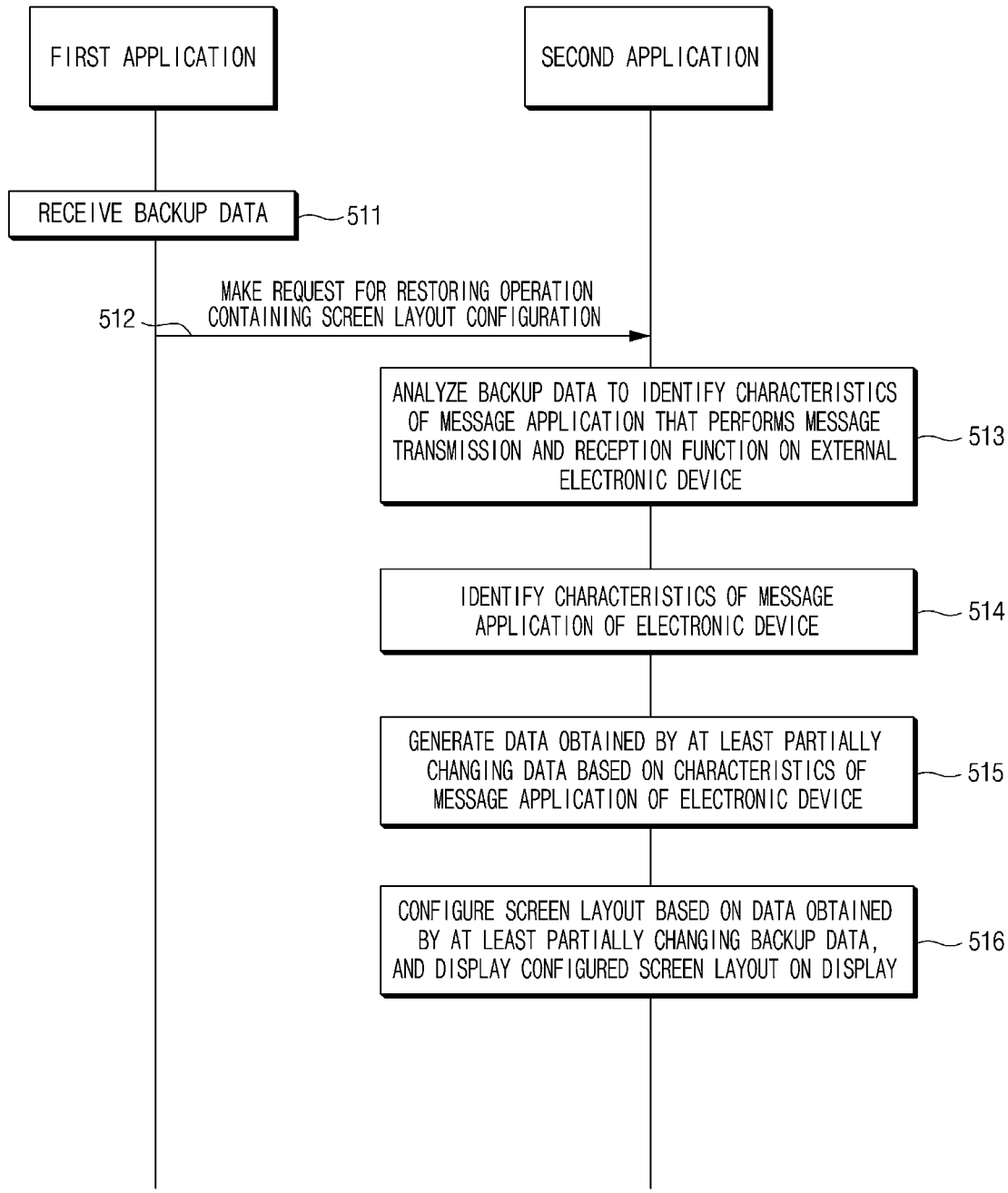
FIG. 5A illustrates a flowchart illustrating that an electronic device configures a screen layout containing an icon of a message application during a restoring operation and displays the configured screen layout on a display, according to various embodiments.

FIG. 5A illustrates a flowchart illustrating that an electronic device configures a screen layout containing an icon of a message application during a restoring operation and displays the configured screen layout on a display, according to various embodiments. Hereinafter, operations described as being performed by an electronic device (e.g., the electronic device 101 in FIG. 1, the electronic device 201 in FIG. 2, or the electronic device 301 in FIG. 3) may be understood as being performed by a processor (e.g., the processor 120 in FIG. 1 or the processor 330 in FIG. 3).

According to various embodiments, in operation 511, the electronic device may use a first application to receive backup data from an external electronic device (e.g., the external electronic devices 102 and 104 in FIG. 1 or the external electronic device 202 in FIG. 2). For example, the first application may perform a function of moving data (e.g., the backup data) between different electronic devices. For example, the backup data may be referred to as first data.

According to various embodiments, in operation 512, the electronic device may make a request for a restoring operation containing screen layout configuration to a second application using the first application. For example, the second application may correspond to a launcher application that sets an operation environment of the electronic device.

According to various embodiments, in operation 513, the electronic device may analyze the backup data using the second application to identify characteristics of a message application that performs a message transmission and reception function on the external electronic device. According to various embodiments, the external electronic device may have a characteristic in which a specified application is set as a default application among a plurality of applications performing the message transmission and reception function. For example, the external electronic device may be in a state in which a third application is set as the default application among the third application and a fourth application performing the message function.

According to various embodiments, the electronic device may identify a type of a message application of the external electronic device based on the backup data, and recognize a location of an icon of the identified message application.

According to various embodiments, the backup data may contain at least one of identification information indicating the message application, information indicating a type (e.g., a widget type and a normal icon type) of the icon of the message application, and information indicating the location of the icon of the message application. For example, when the icon of the message application is located on a home screen, the backup data may contain the page number on the home screen indicating the location of the icon of the message application and a coordinate value (e.g., a value indicating the location of the icon based on a xy coordinate system). For example, when the icon of the message application is located in a region in which the icon is fixedly displayed (e.g., the region 430 in which the icon is fixedly displayed in FIG. 4A), the backup data may contain a coordinate value indicating the location of the icon of the message application within the region. For example, when the message application icon is located on an application drawer screen, the backup data may contain the page number on the application drawer screen and a coordinate value indicating the location of the icon of the message application. For example, when the message application icon is contained within a specified folder, the backup data may contain information identifying a folder indicating the location of the icon of the message application and/or information about a path in which the corresponding folder is located.

In various embodiments, the external electronic device may be in a state in which a plurality of applications performing a specified function (e.g., the message transmission and reception function or a call function) are installed. In this case, the backup data may contain identification information corresponding to each of the plurality of applications. The backup data may contain information indicating a type (e.g., the widget type and the normal icon type) of an icon of each of the plurality of applications. The backup data may contain information indicating a location of the icon of each of the plurality of applications.

According to various embodiments, in operation 514, the electronic device may identify the characteristics of the message application of the electronic device using the second application. According to various embodiments, the electronic device may have the characteristic in which the specified application is set as the default application among the plurality of applications performing the message transmission and reception function. For example, the electronic device may be in a state in which the fourth application is set as the default application among the third application and the fourth application performing the message transmission and reception function.

According to various embodiments, in operation 515, using the second application, the electronic device may generate data obtained by at least partially changing the backup data based on the characteristics of the message application of the electronic device. For example, the data obtained by at least partially changing the backup data may be referred to as the second data.

According to various embodiments, the electronic device may generate the data (e.g., the second data) by at least partially changing the backup data such that the user may easily access the icon of the identified message application of the electronic device. According to various embodiments, the data obtained by at least partially changing the backup data may contain information indicating that location information indicating the location of the icon of the message application is at least partially changed. For example, the data obtained by at least partially changing the backup data may contain information that causes an icon of the fourth application to be located (or displayed) at a location corresponding to a location of an icon of the message application (e.g., the third application) installed in the external electronic device.

According to various embodiments, in operation 516, using the second application, the electronic device may configure the screen layout based on the data (e.g., the second data) obtained by at least partially changing the backup data, and display the configured screen layout on the display.

Figure 5B:
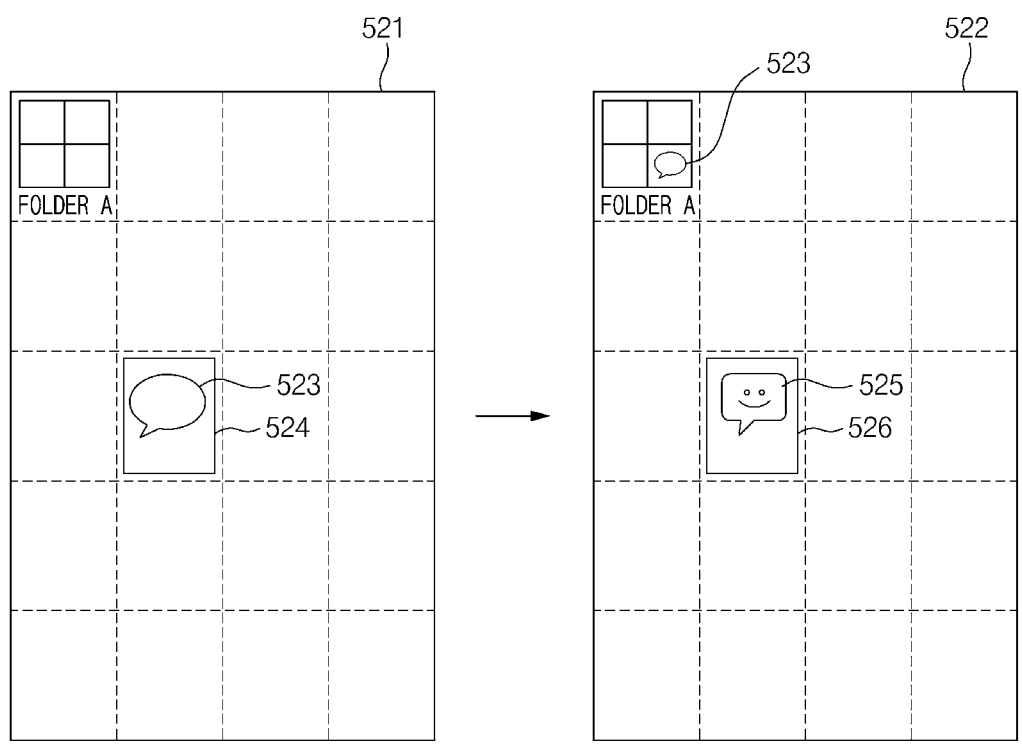
FIG. 5B exemplarily illustrates a screen layout displayed based on data obtained by at least partially changing backup data, according to various embodiments.

FIG. 5B exemplarily illustrates a screen layout displayed based on data obtained by at least partially changing backup data, according to various embodiments.

Referring to FIG. 5B, a first screen 521 exemplarily illustrates an application drawer screen of the external electronic device. A second screen 522 exemplarily illustrates a screen layout configured by the electronic device by at least partially changing the backup data based on the characteristics of the message application. In various embodiments, on the first screen 521 corresponding to the application drawer screen of the external electronic device and the second screen 522 corresponding to an application drawer screen of the electronic device, icons of applications may be located in the same arrangement structure (e.g., a 5×4 arrangement structure).

According to various embodiments, the external electronic device may be in the state in which the third application is installed among the third application and the fourth application performing the message transmission and reception function. Referring to the first screen 521, on the application drawer screen of the external electronic device, the screen layout may be configured such that a first icon 523 indicating the third application is located (or displayed) at a specified first location 524. In various embodiments, the first icon 523 may be located at the first location 524 corresponding to first location information. For example, the first location information may contain a coordinate value along the first axis (e.g., the x-axis) and the second axis (e.g., the y-axis) substantially perpendicular to the first axis.

According to various embodiments, the electronic device may receive backup data corresponding to the first screen 521 from the external electronic device, and at least partially change the backup data based on the characteristics of the electronic device. According to various embodiments, the electronic device may be in the state in which the fourth application is set as the default application among the third application and the fourth application performing the message transmission and reception function.

According to various embodiments, the electronic device may at least partially change the backup data received from the external electronic device to cause the user to easily recognize the fourth application set as the default application of the electronic device. According to various embodiments, the electronic device may at least partially change information related to the screen layout corresponding to the first screen 521 to generate information (e.g., the second data) related to the screen layout corresponding to the second screen 522. The electronic device may perform the restoring operation using the generated information related to the screen layout corresponding to the second screen 522.

According to various embodiments, the electronic device may at least partially change the backup data received from the external electronic device to configure the screen layout that displays the icon of the application to correspond to the characteristics of the electronic device. According to various embodiments, the electronic device may display a second icon 525 of the fourth application at a specified location 526 having the same location information as location information indicating the first location 524 on the first screen 521 of the external electronic device. For example, a coordinate value (e.g., a coordinate value based on the xy coordinate system) contained in the location information of the first location 524 and a coordinate value contained in the location information of the specified location 526 may be the same or substantially the same. According to various embodiments, the electronic device may at least partially change the backup data received from the external electronic device to cause the first icon 523 of the third application to be located (or displayed) in a specified folder (e.g., the folder A).

Figure 5C:
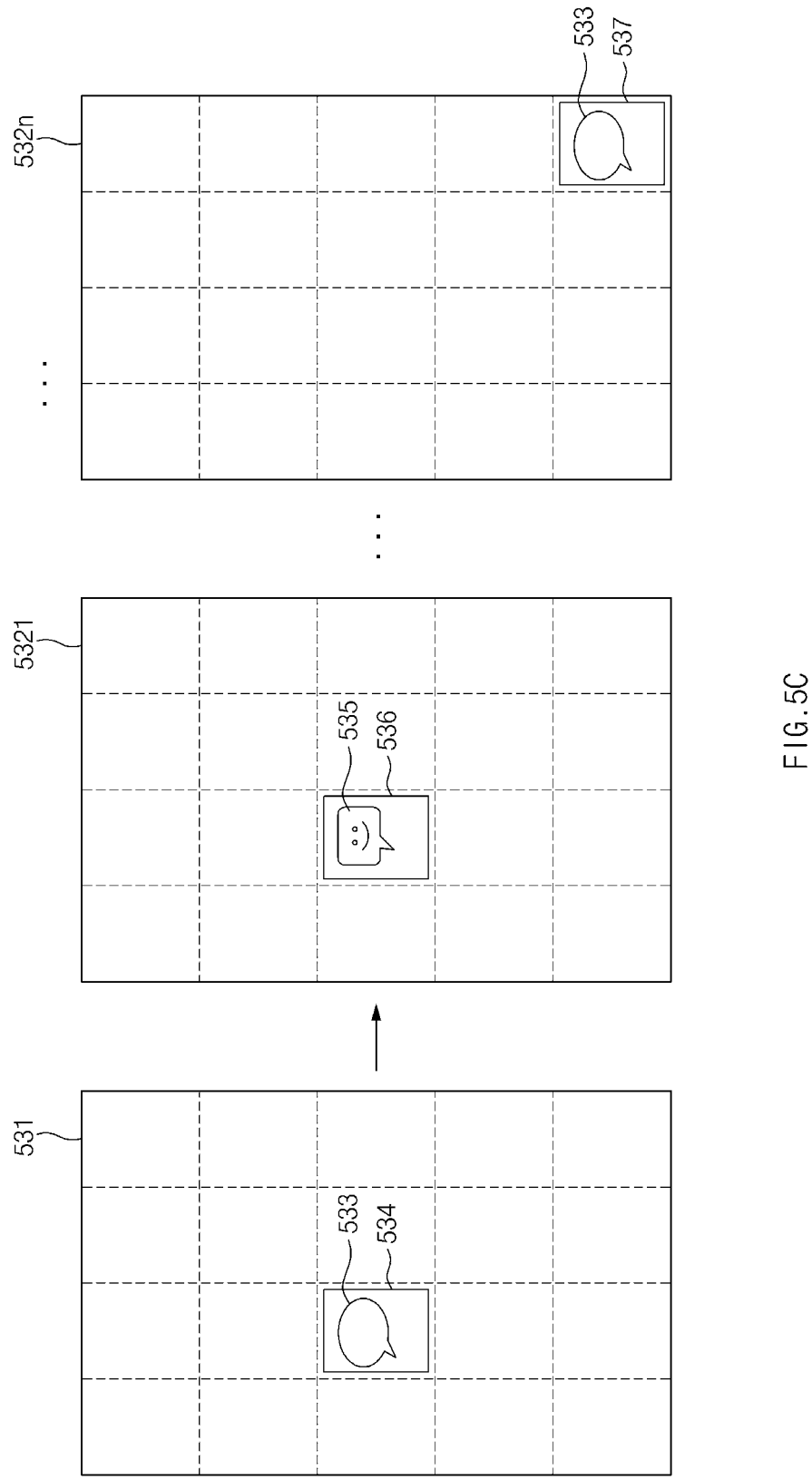
FIG. 5C exemplarily illustrates a screen layout displayed based on data obtained by at least partially changing backup data, according to various embodiments.

FIG. 5C exemplarily illustrates a screen layout displayed based on data obtained by at least partially changing backup data, according to various embodiments.

Referring to FIG. 5C, a first screen 531 exemplarily illustrates the application drawer screen of the external electronic device. A second screen 5321, . . . , and 532*n* having a plurality of pages exemplarily illustrates the screen layout configured by at least partially changing, by the electronic device, the backup data based on the characteristics of the message application. In various embodiments, on the first screen 531 corresponding to the application drawer screen of the external electronic device and the second screen 5321, . . . , and 532*n* having the plurality of pages corresponding to the application drawer screen of the electronic device, the icons of the applications may be located in the same arrangement structure (e.g., the 5×4 arrangement structure).

According to various embodiments, the external electronic device may be in the state in which the third application is installed among the third application and the fourth application performing the message transmission and reception function. Referring to the first screen 531, on the application drawer screen of the external electronic device, the screen layout may be configured such that a first icon 533 indicating the third application is located (or displayed) at a specified first location 534. In various embodiments, the first icon 533 may be located at the first location 534 corresponding to first location information. For example, the first location information may contain a coordinate value along the first axis (e.g., the x-axis) and the second axis (e.g., the y-axis) substantially perpendicular to the first axis.

According to various embodiments, the electronic device may receive backup data corresponding to the first screen 531 from the external electronic device, and may at least partially change the backup data based on the characteristics of the electronic device. According to various embodiments, the electronic device may be in the state in which the fourth application is set as the default application among the third application and the fourth application performing the message transmission and reception function.

According to various embodiments, the electronic device may at least partially change the backup data received from the external electronic device to cause the user to easily recognize the fourth application set as the default application of the electronic device. According to various embodiments, the electronic device may at least partially change information related to the screen layout corresponding to the first screen 531 to generate information (e.g., the second data) related to the screen layout corresponding to the second screen 5321, . . . , and 532*n* having the plurality of pages. The electronic device may perform the restoring operation using the generated information related to the screen layout corresponding to the second screen 5321, . . . , and 532*n* having the plurality of pages.

According to various embodiments, the electronic device may at least partially change the backup data received from the external electronic device to configure the screen layout that displays the icon of the application to correspond to the characteristics of the electronic device. According to various embodiments, a second icon 535 of the fourth application may be displayed at a specified location 536 having the same location information as location information indicating the first location 534 on the first screen 531 of the external electronic device. For example, the coordinate value (e.g., the coordinate value based on the xy coordinate system) contained in the location information of the first location 534 and a coordinate value contained in the location information of the specified location 536 may be the same or substantially the same. According to various embodiments, the electronic device may at least partially change the backup data received from the external electronic device to cause the first icon 533 of the third application to be located (or displayed) at a specified location 537 of a last page of the second screen 5321, . . . , and 532*n* having the plurality of pages.

FIG. 5D exemplarily illustrates a screen layout displayed based on data obtained by at least partially changing backup data, according to various embodiments.

Referring to FIG. 5D, a first screen 541 exemplarily illustrates the application drawer screen of the external electronic device. A second screen 5421, . . . , and 542*n* having a plurality of pages exemplarily illustrates the screen layout configured by the electronic device by at least partially changing the backup data based on the characteristics of the message application. In various embodiments, on the first screen 541 corresponding to the application drawer screen of the external electronic device and the second screen 5421, . . . , 542*n* having the plurality of pages corresponding to the application drawer screen of the electronic device, the icons of the applications may be located in the same arrangement structure (e.g., the 5×4 arrangement structure).

According to various embodiments, the external electronic device may be in the state in which the third application and the fourth application performing the message transmission and reception function are installed. Referring to the first screen 541, on the application drawer screen of the external electronic device, the screen layout may be configured such that a first icon 543 indicating the third application is located at a specified first location 544 and a second icon 545 indicating the fourth application is located (or displayed) at a specified second location 546. In various embodiments, the first icon 543 may be located at the first location 544 corresponding to first location information. For example, the first location information may contain a coordinate value along the first axis (e.g., the x-axis) and the second axis (e.g., the y-axis) substantially perpendicular to the first axis. In various embodiments, the second icon 545 may be located at the second location 546 corresponding to second location information. For example, the second location information may contain a coordinate value along the first axis (e.g., the x-axis) and the second axis (e.g., the y-axis) substantially perpendicular to the first axis.

According to various embodiments, the electronic device may determine a priority of the third application and the fourth application based on the backup data received from the external electronic device. According to various embodiments, the electronic device may determine the priority based on the location of the icon of the application. In various embodiments, when the icon of the application is located in a region in which the icon is fixedly displayed on the home screen (e.g., the region 430 in which the icon is fixedly displayed in FIG. 4A), the electronic device may determine that a priority of the corresponding application is the highest. In various embodiments, when the icon of the application is located on a page of the home screen or the application drawer screen, the electronic device may determine that the corresponding application has an intermediate priority. For example, when the home screen or the drawer screen of the application includes a plurality of pages, the electronic device may determine that the former the page on which the application is located, the higher the priority is. For example, the electronic device may determine that, on the same page, the application that is located at a location closer to an upper left end has a higher priority. In various embodiments, the electronic device may recognize that the former the page on which the application is located among the plurality of different pages, the higher the priority is. The electronic device may determine that, on the same page, the application located in an upper row has a higher priority, and that, in the same row, the application located in a further left column has a higher priority. For example, as shown in FIG. 4B, the electronic device may recognize that the priority of the application located at the upper left end 4411 is the highest. Next, the electronic device may recognize the priorities of the applications to correspond to the order of locations 4411, 4412, 4413, 4414, . . . , and 4432 sequential based on the order installed in the electronic device from the upper left end 4411. In various embodiments, the electronic device may determine that the priority is the lowest in a case of an application contained in a folder of the home screen or the drawer screen of the application.

According to various embodiments, the electronic device may determine priorities of the first icon 543 of the third application located at the first location 544 and the second icon 545 of the fourth application located at the second location 546 based on the backup data. In various embodiments, because the first location 544 of the first icon 543 is closer to the upper left end than the second location 546 of the second icon 545, the electronic device may recognize that the priority of the third application corresponding to the first icon 543 is relatively higher. For example, because the first location 544 of the first icon 543 is located in the further left column than the second location 546 of the second icon 545 in the same row, the electronic device may recognize that the priority of the third application corresponding to the first icon 543 is relatively higher.

According to various embodiments, the electronic device may receive backup data corresponding to the first screen 541 from the external electronic device, and at least partially change the backup data based on the characteristics of the electronic device. According to various embodiments, the electronic device may be in the state in which the fourth application is set as the default application among the third application and the fourth application performing the message transmission and reception function.

According to various embodiments, the electronic device may at least partially change the backup data received from the external electronic device to cause the user to easily recognize the fourth application set as the default application of the electronic device. According to various embodiments, the electronic device may at least partially change information related to the screen layout corresponding to the first screen 541 to generate information (e.g., the second data) related to the screen layout corresponding to the second screen 5421, . . . , and 542n having the plurality of pages. The electronic device may perform the restoring operation using the generated information related to the screen layout corresponding to the second screen 5421, . . . , and 542n having the plurality of pages.

According to various embodiments, the electronic device may at least partially change the backup data received from the external electronic device to configure the screen layout that displays the icon of the application to correspond to the characteristics of the electronic device. According to various embodiments, the electronic device may display the second icon 545 of the fourth application at a specified location 547 having the same location information as location information indicating the first location 544 where the icon of the third application recognized as having the higher priority is located. For example, a coordinate value (e.g., the coordinate value based on the xy coordinate system) contained in the location information of the first location 544 and a coordinate value contained in the location information of the specified location 547 may be the same or substantially the same. According to various embodiments, the electronic device may at least partially change the backup data received from the external electronic device to cause the first icon 543 of the third application to be located (or displayed) at a specified location 548 of a last page of the second screen 5421, . . . , and 542n having the plurality of pages.

Although not shown in FIG. 5D, in various embodiments, information serving as a criterion for the electronic device to determine the priority of the application may be two or more information. For example, when determining the priority of the application, the electronic device may use information about whether the icon is displayed in a specified region (e.g., the region 430 in which the icon is fixedly displayed in FIG. 4A) on the home screen and information about the display location of the icon on the application drawer screen together. In various embodiments, the second icon 545 of the fourth application may be located in a further right column than the first icon 543 of the third application on the first screen 541, and may be further located in a region where the icon is fixedly displayed on the home screen (e.g., the region 430 where the icon is fixedly displayed in FIG. 4A). The third application may have the relatively high priority when based only on the display location on the application drawer screen, but the electronic device may recognize that the priority of the fourth application is higher than the priority of the third application based on the information indicating that the second icon 545 of the fourth application is located in the region where the icon is fixedly displayed on the home screen (e.g., the region 430 where the icon is fixedly displayed in FIG. 4A). In this case, the electronic device may at least partially change the backup data received from the external electronic device to configure the screen layout that displays the icon of the application to correspond to the characteristics of the electronic device. The electronic device may perform the restoring operation such that an icon (e.g., the second icon 545) of the fourth application that is the default application that performs the message function of the electronic device is displayed at a location having the same location information as location information indicating the second location 546 of the second icon 545 of the fourth application.

Figure 5E:
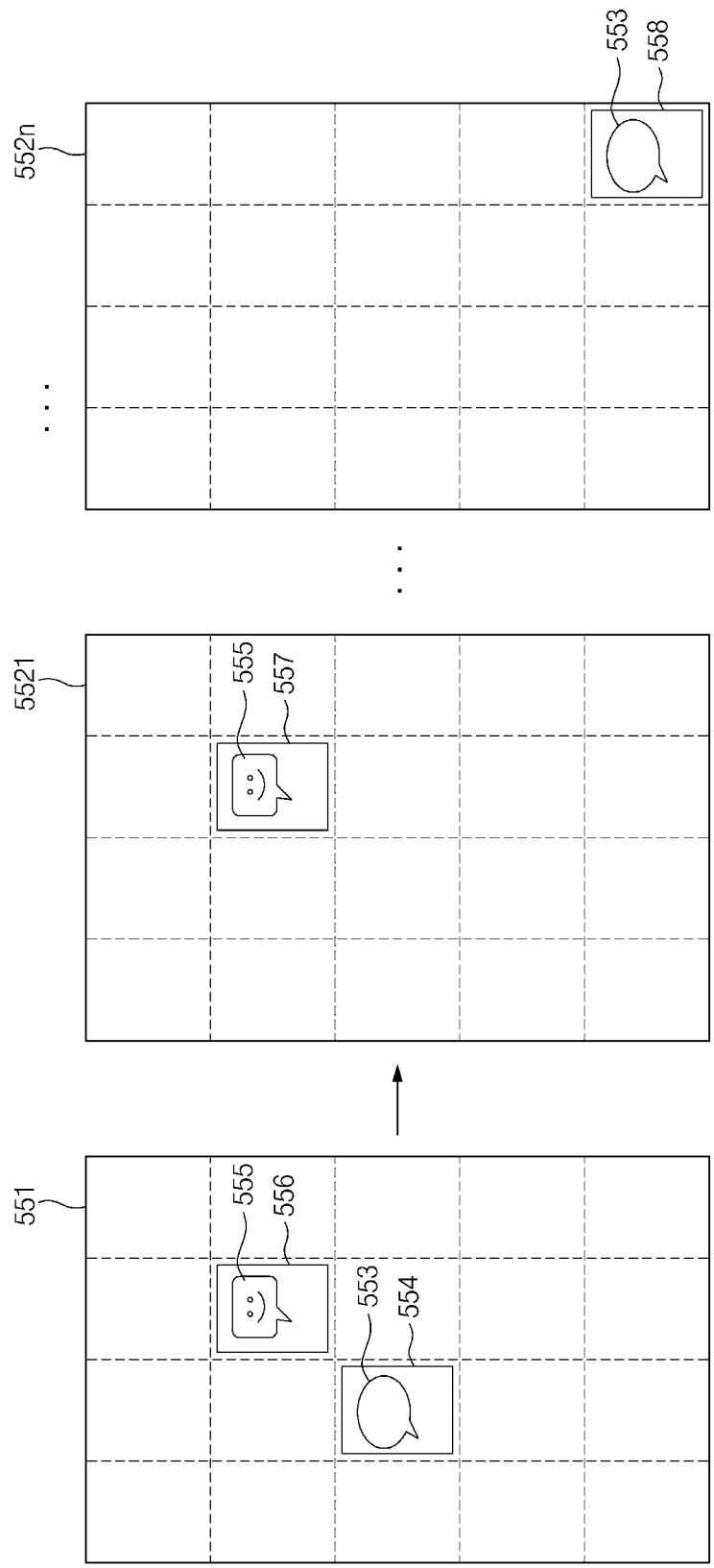
FIG. 5E exemplarily illustrates a screen layout displayed based on data obtained by at least partially changing backup data, according to various embodiments.

FIG. 5E exemplarily illustrates a screen layout displayed based on data obtained by at least partially changing backup data, according to various embodiments.

Referring to FIG. 5E, a first screen 551 exemplarily illustrates the application drawer screen of the external electronic device. A second screen 5521, . . . , and 552n having a plurality of pages exemplarily illustrates the screen layout configured by the electronic device by at least partially changing the backup data based on the characteristics of the message application. In various embodiments, on the first screen 551 corresponding to the application drawer screen of the external electronic device and the second screen 5521, . . . , and 552n having the plurality of pages corresponding to the application drawer screen of the electronic device, the icons of the applications may be located in the same arrangement structure (e.g., the 5×4 arrangement structure).

According to various embodiments, the external electronic device may be in the state in which the third application and the fourth application performing the message transmission and reception function are installed. Referring to the first screen 551, on the application drawer screen of the external electronic device, the screen layout may be configured such that a first icon 553 indicating the third application is located at a specified first location 554 and a second icon 555 indicating the fourth application is located (or displayed) at a specified second location 556. In various embodiments, the first icon 553 may be located at the first location 554 corresponding to first location information. For example, the first location information may contain a coordinate value along the first axis (e.g., the x-axis) and the second axis (e.g., the y-axis) substantially perpendicular to the first axis. In various embodiments, the second icon 555 may be located at the second location 556 corresponding to second location information. For example, the second location information may contain a coordinate value along the first axis (e.g., the x-axis) and the second axis (e.g., the y-axis) substantially perpendicular to the first axis.

According to various embodiments, the electronic device may determine priorities of the first icon 553 of the third application located at the first location 554 and the second icon 555 of the fourth application located at the second location 556 based on the backup data. In various embodiments, because the second location 556 of the second icon 555 is located in the upper row than the first location 554 of the first icon 553, the electronic device may recognize that the priority of the fourth application corresponding to the second icon 555 is relatively higher.

According to various embodiments, the electronic device may receive backup data corresponding to the first screen 551 from the external electronic device, and at least partially change the backup data based on the characteristics of the electronic device. According to various embodiments, the electronic device may be in the state in which the fourth application is set as the default application among the third application and the fourth application performing the message transmission and reception function.

According to various embodiments, the electronic device may at least partially change the backup data received from the external electronic device to cause the user to easily recognize the fourth application set as the default application of the electronic device. According to various embodiments, the electronic device may at least partially change information related to the screen layout corresponding to the first screen 551 to generate information (e.g., the second data) related to the screen layout corresponding to the second screen 5521, . . . , and 552n having the plurality of pages. The electronic device may perform the restoring operation using the generated information related to the screen layout corresponding to the second screen 5521, . . . , and 552n having the plurality of pages.

According to various embodiments, the electronic device may at least partially change the backup data received from the external electronic device to configure the screen layout that displays the icon of the application to correspond to the characteristics of the electronic device. According to various embodiments, the electronic device may display the second icon 555 of the fourth application at a specified location 557 having the same location information as location information indicating the second location 556 on the first screen 551 where the second icon 555 of the fourth application recognized as having the higher priority is located. For example, a coordinate value (e.g., the coordinate value based on the xy coordinate system) contained in the location information of the second location 556 and a coordinate value contained in the location information of the specified location 557 may be the same or substantially the same. According to various embodiments, the electronic device may at least partially change the backup data received from the external electronic device to cause the icon 553 of the third application to be located (or displayed) at a specified location 558 of a last page of the second screen 5521, . . . , and 552n having the plurality of pages.

Figure 5F:
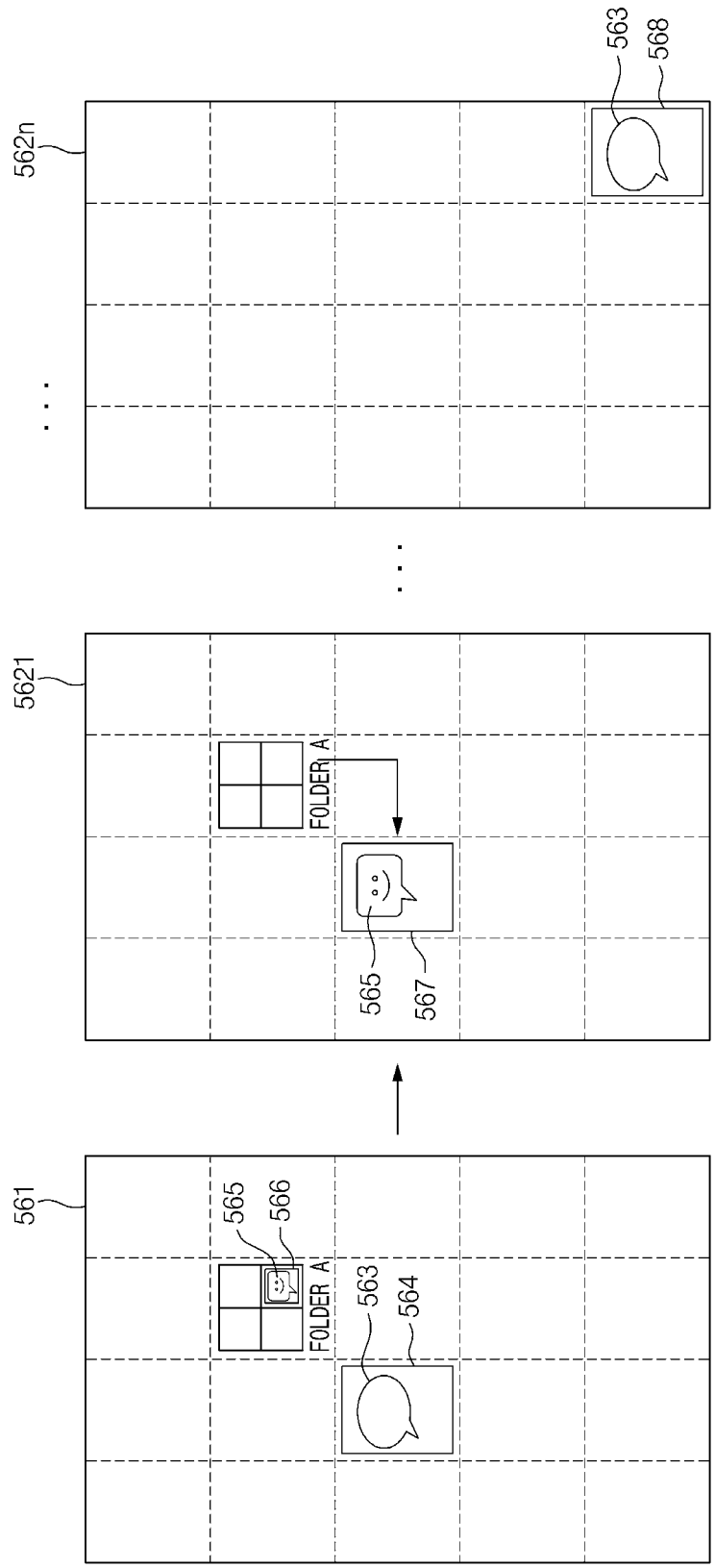
FIG. 5F exemplarily illustrates a screen layout displayed based on data obtained by at least partially changing backup data, according to various embodiments.

FIG. 5F exemplarily illustrates a screen layout displayed based on data obtained by at least partially changing backup data, according to various embodiments.

Referring to FIG. 5F, a first screen 561 exemplarily illustrates the application drawer screen of the external electronic device. A second screen 5621, . . . , and 562n having a plurality of pages exemplarily illustrates the screen layout configured by the electronic device by at least partially changing the backup data based on the characteristics of the message application. In various embodiments, on the first screen 561 corresponding to the application drawer screen of the external electronic device and the second screen 5621, . . . , and 562n having the plurality of pages corresponding to the application drawer screen of the electronic device, the icons of the applications may be located in the same arrangement structure (e.g., the 5×4 arrangement structure).

According to various embodiments, the external electronic device may be in the state in which the third application and the fourth application performing the message transmission and reception function are installed. Referring to the first screen 561, on the application drawer screen of the external electronic device, the screen layout may be configured such that a first icon 563 indicating the third application is located at a specified first location 564 and a second icon 565 indicating the fourth application is located (or displayed) at a specified second location 566 in a specified folder (e.g., the folder A). In various embodiments, the first icon 563 may be located at the first location 564 corresponding to first location information. For example, the first location information may contain a coordinate value along the first axis (e.g., the x-axis) and the second axis (e.g., the y-axis) substantially perpendicular to the first axis. In various embodiments, the second icon 565 may be located at the second location 566 in the specified folder corresponding to second location information. For example, the second location information may contain a coordinate value along the first axis (e.g., the x-axis) and the second axis (e.g., the y-axis) substantially perpendicular to the first axis.

According to various embodiments, the electronic device may receive backup data corresponding to the first screen 561 from the external electronic device, and at least partially change the backup data based on the characteristics of the electronic device. According to various embodiments, the electronic device may be in the state in which the fourth application is set as the default application among the third application and the fourth application performing the message transmission and reception function.

According to various embodiments, the electronic device may at least partially change the backup data received from the external electronic device to cause the user to easily recognize the fourth application set as the default application of the electronic device. According to various embodiments, the electronic device may at least partially change information related to the screen layout corresponding to the first screen 561 to generate information (e.g., the second data) related to the screen layout corresponding to the second screen 5621, . . . , and 562n having the plurality of pages. The electronic device may perform the restoring operation using the generated information related to the screen layout corresponding to the second screen 5621, . . . , and 562n having the plurality of pages.

According to various embodiments, the electronic device may at least partially change the backup data received from the external electronic device to configure the screen layout that displays the icon of the application to correspond to the characteristics of the electronic device. According to various embodiments, the electronic device may display the second icon 565 of the fourth application at a specified location 567 having the same location information as location information indicating the first location 564 on the first screen 561 of the external electronic device. For example, a coordinate value (e.g., the coordinate value based on the xy coordinate system) contained in the location information of the first location 564 and a coordinate value contained in the location information of the specified location 567 may be the same or substantially the same. According to various embodiments, the electronic device may at least partially change the backup data received from the external electronic device to cause the first icon 563 of the third application to be located (or displayed) at a specified location 568 of a last page of the second screen 5621, . . . and 562n having the plurality of pages.

Figure 5G:
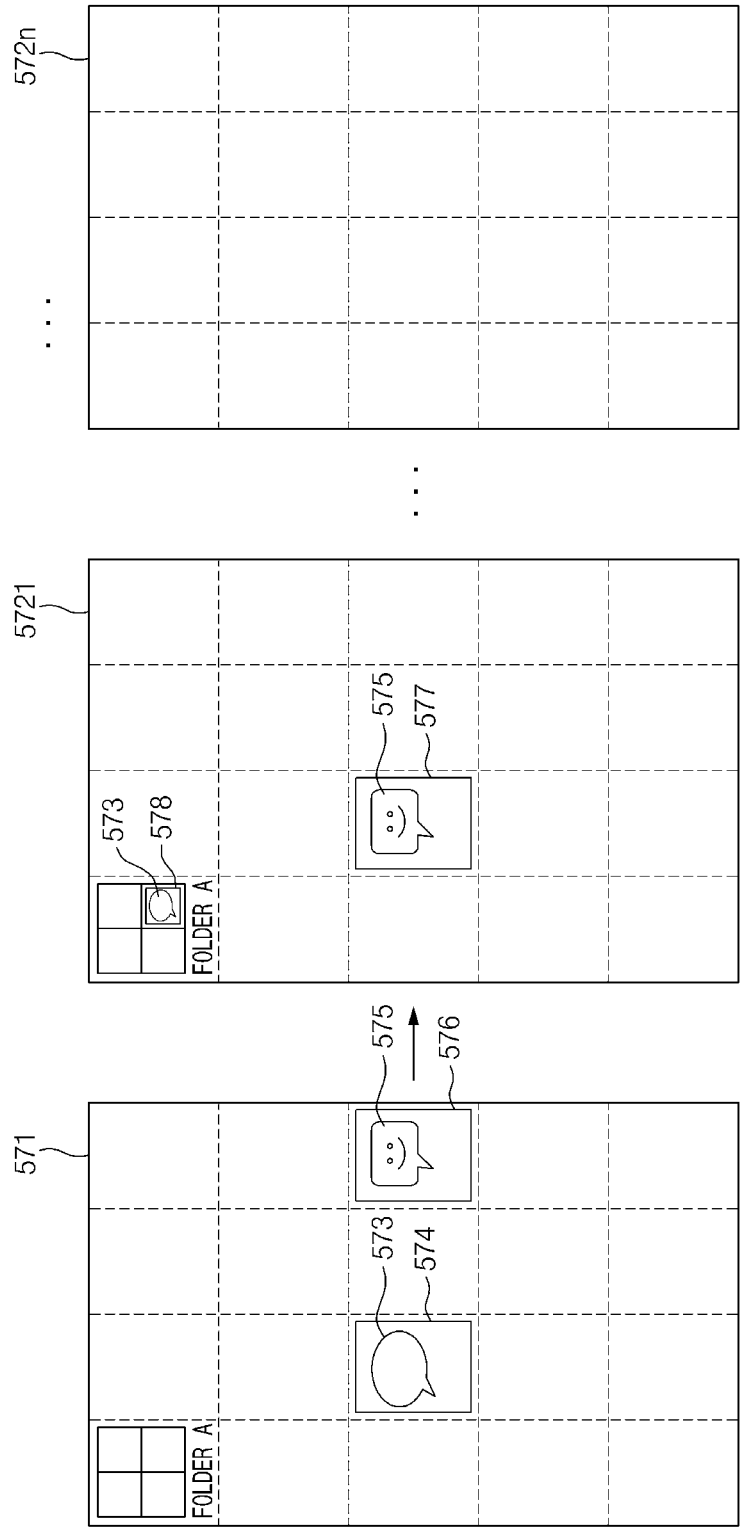
FIG. 5G exemplarily illustrates a screen layout displayed based on data obtained by at least partially changing backup data, according to various embodiments.

FIG. 5G exemplarily illustrates a screen layout displayed based on data obtained by at least partially changing backup data, according to various embodiments.

Referring to FIG. 5G, a first screen 571 exemplarily illustrates the application drawer screen of the external electronic device. A second screen 5721, . . . , and 572n having a plurality of pages exemplarily illustrates the screen layout configured by the electronic device by at least partially changing the backup data based on the characteristics of the message application. In various embodiments, on the first screen 571 corresponding to the application drawer screen of the external electronic device and the second screen 5721, . . . , and 572n having the plurality of pages corresponding to the application drawer screen of the electronic device, the icons of the applications may be located in the same arrangement structure (e.g., the 5×4 arrangement structure).

According to various embodiments, the external electronic device may be in the state in which the third application and the fourth application performing the message transmission and reception function are installed. Referring to the first screen 571, on the application drawer screen of the external electronic device, the screen layout may be configured such that a first icon 573 indicating the third application is located at a specified first location 574 and a second icon 575 indicating the fourth application is located (or displayed) at a specified second location 576. In various embodiments, the first icon 573 may be located at the first location 574 corresponding to first location information. For example, the first location information may contain a coordinate value along the first axis (e.g., the x-axis) and the second axis (e.g., the y-axis) substantially perpendicular to the first axis. In various embodiments, the second icon 575 may be located at the second location 576 corresponding to second location information. For example, the second location information may contain a coordinate value along the first axis (e.g., the x-axis) and the second axis (e.g., the y-axis) substantially perpendicular to the first axis.

According to various embodiments, the electronic device may determine priorities of the third application and the fourth application based on the backup data received from the external electronic device. In various embodiments, the electronic device may determine the priority based on the location of the icon of the application.

According to various embodiments, the electronic device may determine priorities of the first icon 573 of the third application located at the first location 574 and the second icon 575 of the fourth application located at the second location 576 based on the backup data. In various embodiments, because the first location 574 of the first icon 573 is located in the further left column than the second location 576 of the second icon 575, the electronic device may recognize that the priority of the third application corresponding to the first icon 573 is relatively higher.

According to various embodiments, the electronic device may receive backup data corresponding to the first screen 571 from the external electronic device, and at least partially change the backup data based on the characteristics of the electronic device. According to various embodiments, the electronic device may be in the state in which the fourth application is set as the default application among the third application and the fourth application performing the message transmission and reception function.

According to various embodiments, the electronic device may at least partially change the backup data received from the external electronic device to cause the user to easily recognize the fourth application set as the default application of the electronic device. According to various embodiments, the electronic device may at least partially change information related to the screen layout corresponding to the first screen 571 to generate information (e.g., the second data) related to the screen layout corresponding to the second screen 5721, . . . , and 572n having the plurality of pages. The electronic device may perform the restoring operation using the generated information related to the screen layout corresponding to the second screen 5721, . . . , and 572n having the plurality of pages.

According to various embodiments, the electronic device may at least partially change the backup data received from the external electronic device to configure the screen layout that displays the icon of the application to correspond to the characteristics of the electronic device. According to various embodiments, the electronic device may display the second icon 575 of the fourth application at a specified location 577 having the same location information as location information indicating the first location 574 where the icon of the third application recognized as having the higher priority is located. For example, a coordinate value (e.g., the coordinate value based on the xy coordinate system) contained in the location information of the first location 574 and a coordinate value contained in the location information of the specified location 577 may be the same or substantially the same. According to various embodiments, the electronic device may at least partially change the backup data received from the external electronic device to cause the first icon 573 of the third application to be located (or displayed) at a specified location 578 in the specified folder (e.g., the folder A) of the second screen 572₁, . . . , and 572n having the plurality of pages.

Figure 5H:
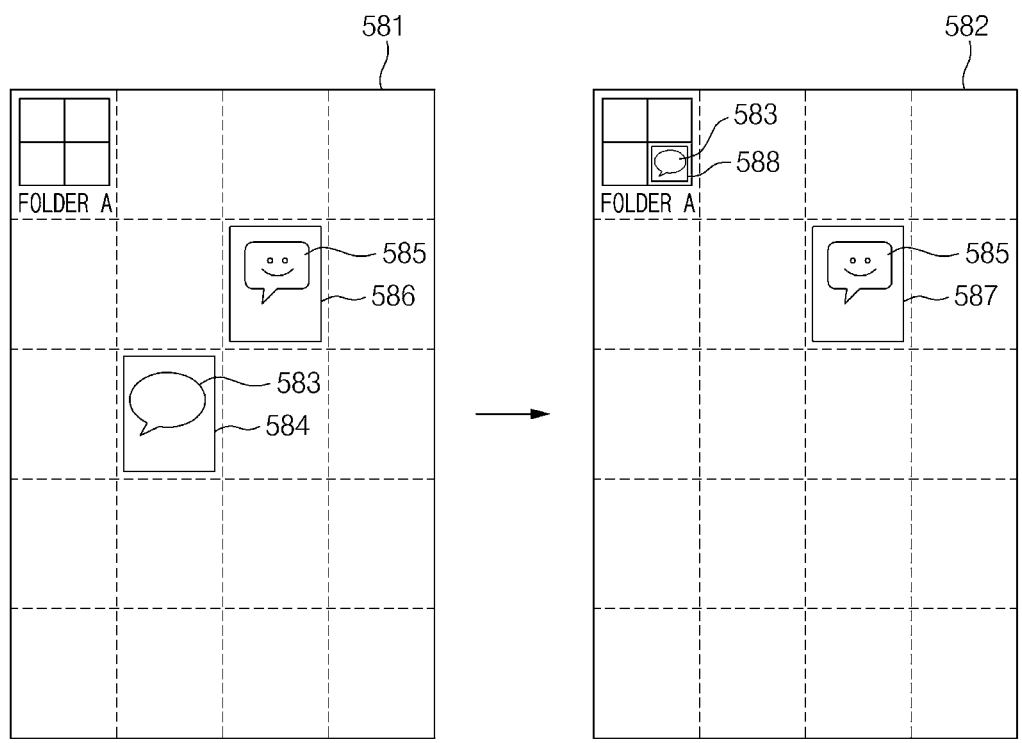
FIG. 5H exemplarily illustrates a screen layout displayed based on data obtained by at least partially changing backup data, according to various embodiments.
Figure 51:
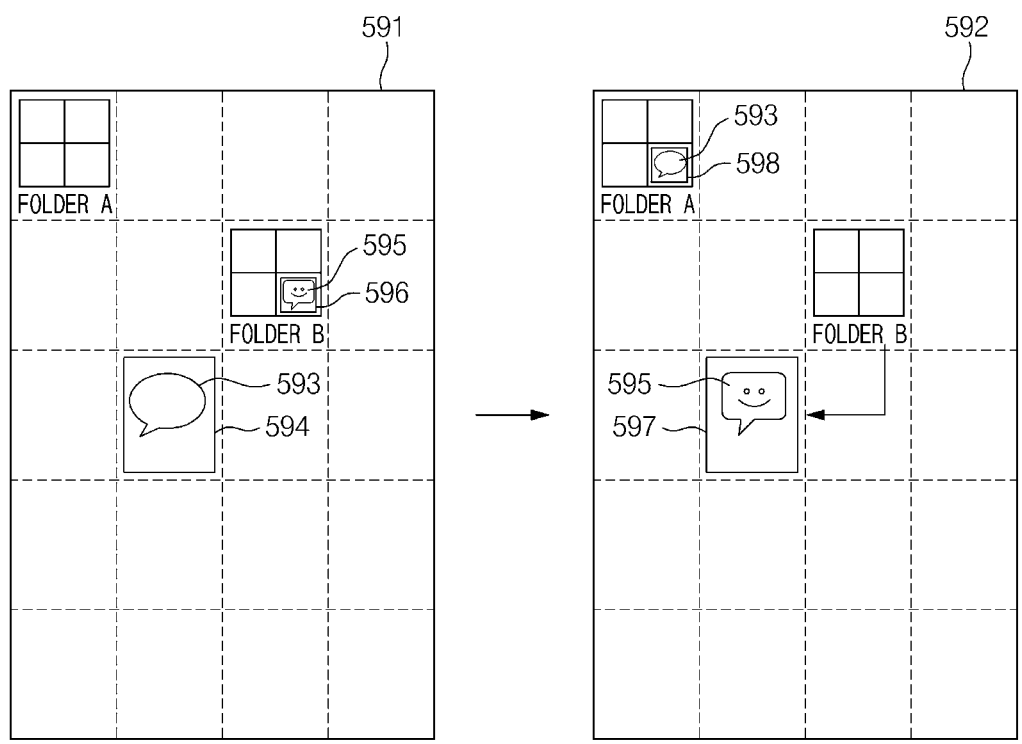

FIG. 5H exemplarily illustrates a screen layout displayed based on data obtained by at least partially changing backup data, according to various embodiments.

Referring to FIG. 5H, a first screen 581 exemplarily illustrates the application drawer screen of the external electronic device. A second screen 582 exemplarily illustrates the screen layout configured by the electronic device by at least partially changing the backup data based on the characteristics of the message application. In various embodiments, on the first screen 581 corresponding to the application drawer screen of the external electronic device and the second screen 582 corresponding to the application drawer screen of the electronic device, the icons of the applications may be located in the same arrangement structure (e.g., the 5×4 arrangement structure).

According to various embodiments, the external electronic device may be in the state in which the third application and the fourth application performing the message transmission and reception function are installed. Referring to the first screen 581, on the application drawer screen of the external electronic device, the screen layout may be configured such that a first icon 583 indicating the third application is located at a specified first location 584 and a second icon 585 indicating the fourth application is located (or displayed) at a specified second location 586. In various embodiments, the first icon 583 may be located at the first location 584 corresponding to first location information. For example, the first location information may contain a coordinate value along the first axis (e.g., the x-axis) and the second axis (e.g., the y-axis) substantially perpendicular to the first axis. In various embodiments, the second icon 585 may be located at the second location 586 corresponding to second location information. For example, the second location information may contain a coordinate value along the first axis (e.g., the x-axis) and the second axis (e.g., the y-axis) substantially perpendicular to the first axis.

According to various embodiments, the electronic device may receive backup data corresponding to the first screen 581 from the external electronic device, and at least partially change the backup data based on the characteristics of the electronic device. According to various embodiments, the electronic device may be in the state in which the fourth application is set as the default application among the third application and the fourth application performing the message transmission and reception function.

According to various embodiments, the electronic device may at least partially change the backup data received from the external electronic device to cause the user to easily recognize the fourth application set as the default application of the electronic device. According to various embodiments, the electronic device may at least partially change information related to the screen layout corresponding to the first screen 581 to generate information (e.g., the second data) related to the screen layout corresponding to the second screen 582. The electronic device may perform the restoring operation using the generated information related to the screen layout corresponding to the second screen 582 having the plurality of pages.

According to various embodiments, the electronic device may at least partially change the backup data received from the external electronic device to configure the screen layout that displays the icon of the application to correspond to the characteristics of the electronic device. According to various embodiments, the electronic device may display the second icon 585 of the fourth application at a specified location 587 having the same location information as location information indicating the second location 586 on the first screen 581 of the external electronic device. For example, a coordinate value (e.g., the coordinate value based on the xy coordinate system) contained in the location information of the second location 586 and a coordinate value contained in the location information of the specified location 587 may be the same or substantially the same. According to various embodiments, the electronic device may at least partially change the backup data received from the external electronic device to cause the first icon 583 of the third application to be located (or displayed) at a specified location 588 in the specified folder (e.g., the folder A).

FIG. 5I exemplarily illustrates a screen layout displayed based on data obtained by at least partially changing backup data, according to various embodiments.

Referring to FIG. 5I, a first screen 591 exemplarily illustrates the application drawer screen of the external electronic device. A second screen 592 exemplarily illustrates the screen layout configured by the electronic device by at least partially changing the backup data based on the characteristics of the message application. In various embodiments, on the first screen 591 corresponding to the application drawer screen of the external electronic device and the second screen 592 corresponding to the application drawer screen of the electronic device, the icons of the applications may be located in the same arrangement structure (e.g., the 5×4 arrangement structure).

According to various embodiments, the external electronic device may be in the state in which the third application and the fourth application performing the message transmission and reception function are installed. Referring to the first screen 591, on the application drawer screen of the external electronic device, the screen layout may be configured such that a first icon 593 indicating the third application is located at a specified first location 594 and a second icon 595 indicating the fourth application is located (or displayed) at a specified second location 596 in a specified folder (e.g., the folder B). In various embodiments, the first icon 593 may be located at the first location 594 corresponding to first location information. For example, the first location information may contain a coordinate value along the first axis (e.g., the x-axis) and the second axis (e.g., the y-axis) substantially perpendicular to the first axis. In various embodiments, the second icon 595 may be located at the second location 596 in the specified folder corresponding to second location information. For example, the second location information may contain a coordinate value along the first axis (e.g., the x-axis) and the second axis (e.g., the y-axis) substantially perpendicular to the first axis.

According to various embodiments, the electronic device may receive backup data corresponding to the first screen 591 from the external electronic device, and at least partially change the backup data based on the characteristics of the electronic device. According to various embodiments, the electronic device may be in the state in which the fourth application is set as the default application among the third application and the fourth application performing the message transmission and reception function.

According to various embodiments, the electronic device may at least partially change the backup data received from the external electronic device to cause the user to easily recognize the fourth application set as the default application of the electronic device. According to various embodiments, the electronic device may at least partially change information related to the screen layout corresponding to the first screen 591 to generate information (e.g., the second data) related to the screen layout corresponding to the second screen 592. The electronic device may perform the restoring operation using the generated information related to the screen layout corresponding to the second screen 592 having the plurality of pages.

According to various embodiments, the electronic device may at least partially change the backup data received from the external electronic device to configure the screen layout that displays the icon of the application to correspond to the characteristics of the electronic device. According to various embodiments, the electronic device may display the second icon 595 of the fourth application at a specified location 597 having the same location information as location information indicating the first location 594 on the first screen 591 of the external electronic device. For example, a coordinate value (e.g., the coordinate value based on the xy coordinate system) contained in the location information of the first location 594 and a coordinate value contained in the location information of the specified location 597 may be the same or substantially the same. According to various embodiments, the electronic device may at least partially change the backup data received from the external electronic device to cause the first icon 593 of the third application to be located (or displayed) at a specified location 598 in the specified folder (e.g., the folder A). In this case, the specified folder (e.g., the folder A) may be a folder containing applications related to the third application. For example, the specified folder (e.g., the folder A) containing the first icon 593 of the third application may be a folder containing applications operated by a service operator of the third application.

In the scheme described above, the electronic device may receive the backup data from the external electronic device, and perform the restoring operation of configuring the screen layout by partially modifying the backup data based on the characteristics of the electronic device (e.g., a type of the default application that performs the specified function). The electronic device according to an embodiment may provide a user with the new use experience based on the characteristics of the electronic device by performing the restoring operation based on the characteristics of the electronic device.

Figure 6A:
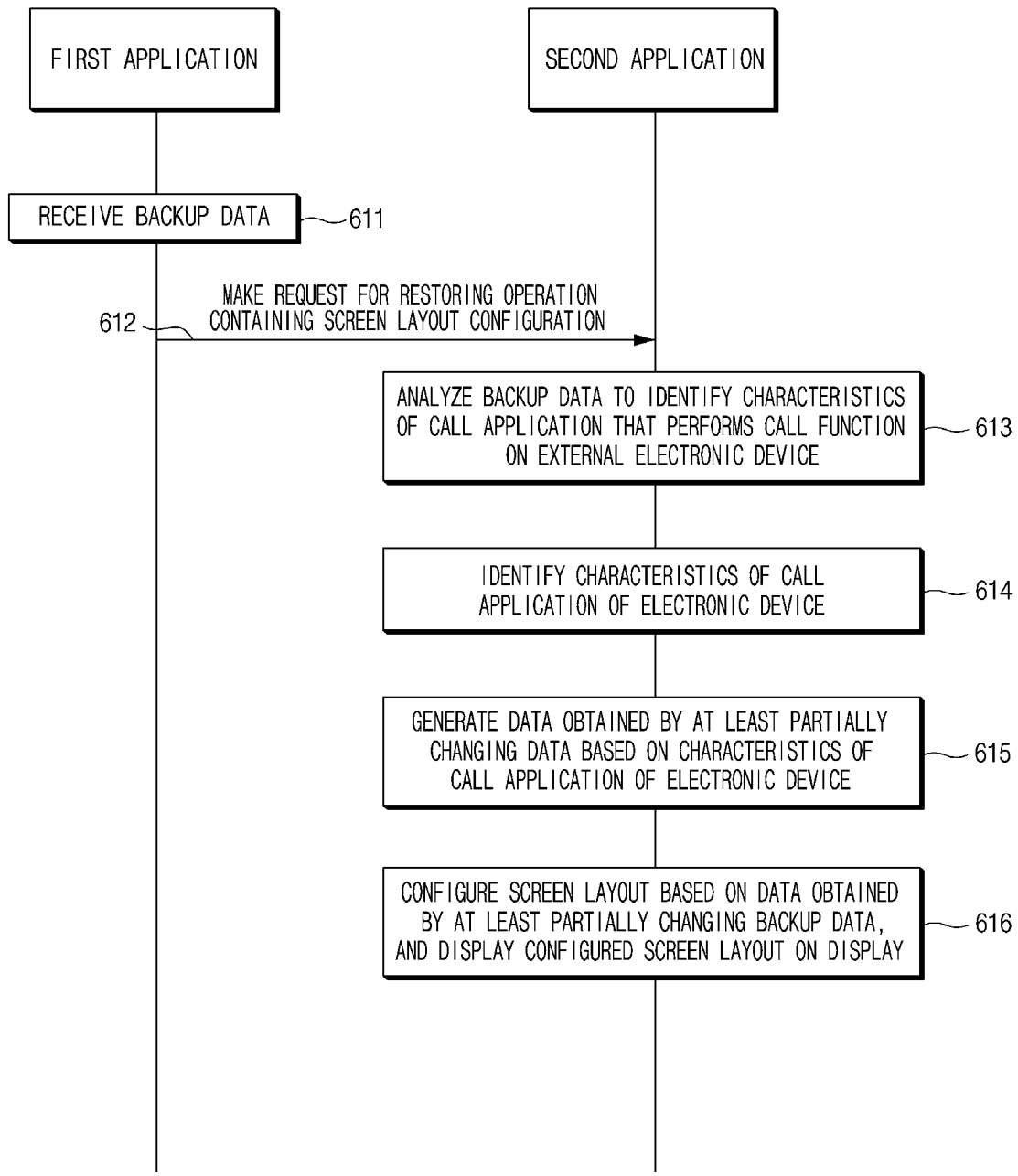
FIG. 6A illustrates a flowchart illustrating that an electronic device configures a screen layout containing an icon of a call application during a restoring operation and displays the configured screen layout on a display, according to various embodiments.

FIG. 6A illustrates a flowchart illustrating that an electronic device configures a screen layout containing an icon of a call application during a restoring operation and displays the configured screen layout on a display, according to various embodiments. Hereinafter, operations described as being performed by an electronic device (e.g., the electronic device 101 in FIG. 1, the electronic device 201 in FIG. 2, or the electronic device 301 in FIG. 3) may be understood as being performed by a processor (e.g., the processor 120 in FIG. 1 or the processor 330 in FIG. 3).

According to various embodiments, in operation 611, the electronic device may receive backup data from an external electronic device (e.g., the external electronic devices 102 and 104 in FIG. 1 or the external electronic device 202 in FIG. 2) using a first application. For example, the first application may perform a function of moving data (e.g., the backup data) between different electronic devices. For example, the backup data may be referred to as first data.

According to various embodiments, in operation 612, the electronic device may make a request for a restoring operation containing screen layout configuration to a second application using the first application. For example, the second application may correspond to a launcher application that sets an operation environment of the electronic device.

According to various embodiments, in operation 613, the electronic device may analyze the backup data using the second application to identify characteristics of a call application that performs a call function on the external electronic device. According to various embodiments, the external electronic device may have a characteristic in which a specified application is set as a default application among a plurality of applications performing the call function. For example, the external electronic device may be in a state in which a third application is set as the default application among the third application and a fourth application performing the call function.

According to various embodiments, the electronic device may identify a type of the default application that performs the call function of the external electronic device based on the backup data, and recognize a location of the icon of the identified call application.

According to various embodiments, the backup data may contain at least one of identification information indicating the call application, information indicating a type (e.g., a widget type and a normal icon type) of the icon of the call application, and information indicating the location of the icon of the call application. For example, when the icon of the call application is located on a home screen, the backup data may contain the page number on the home screen indicating the location of the icon of the call application and a coordinate value (e.g., a value indicating the location of the icon based on a xy coordinate system). For example, when the icon of the call application is located in a region in which the icon is fixedly displayed (e.g., the region 430 in which the icon is fixedly displayed in FIG. 4A), the backup data may contain a coordinate value indicating the location of the icon of the call application within the region. For example, when the call application icon is located on an application drawer screen, the backup data may contain the page number on the application drawer screen and a coordinate value indicating the location of the icon of the call application. For example, when the call application icon is contained within a specified folder, the backup data may contain information identifying a folder indicating the location of the icon of the call application and/or information about a path in which the corresponding folder is located.

According to various embodiments, in operation 614, the electronic device may identify the characteristics of the call application of the electronic device using the second application. According to various embodiments, the electronic device may have the characteristic in which the specified application is set as the default application among the plurality of applications performing the call function. For example, the electronic device may be in a state in which the fourth application is set as the default application among the third application and the fourth application performing the call function.

According to various embodiments, in operation 615, using the second application, the electronic device may generate data obtained by at least partially changing the backup data based on the characteristics of the call application of the electronic device. For example, the data obtained by at least partially changing the backup data may be referred to as the second data.

According to various embodiments, the electronic device may generate the data (e.g., the second data) by at least partially changing the backup data such that the user may easily access the icon of the identified call application of the electronic device. According to various embodiments, the data obtained by at least partially changing the backup data may contain information indicating that location information indicating the location of the icon of the call application is at least partially changed. For example, the data obtained by at least partially changing the backup data may contain information that causes an icon of the fourth application to be located (or displayed) at a location corresponding to a location of an icon of the call application (e.g., the third application) installed in the external electronic device.

According to various embodiments, in operation 616, using the second application, the electronic device may configure the screen layout based on the data (e.g., the second data) obtained by at least partially changing the backup data, and display the configured screen layout on the display. In various embodiments, the user of the electronic device may easily recognize the fourth application as the fourth application is displayed at the display location corresponding to the display location of the third application of the external electronic device.

Figure 6B:
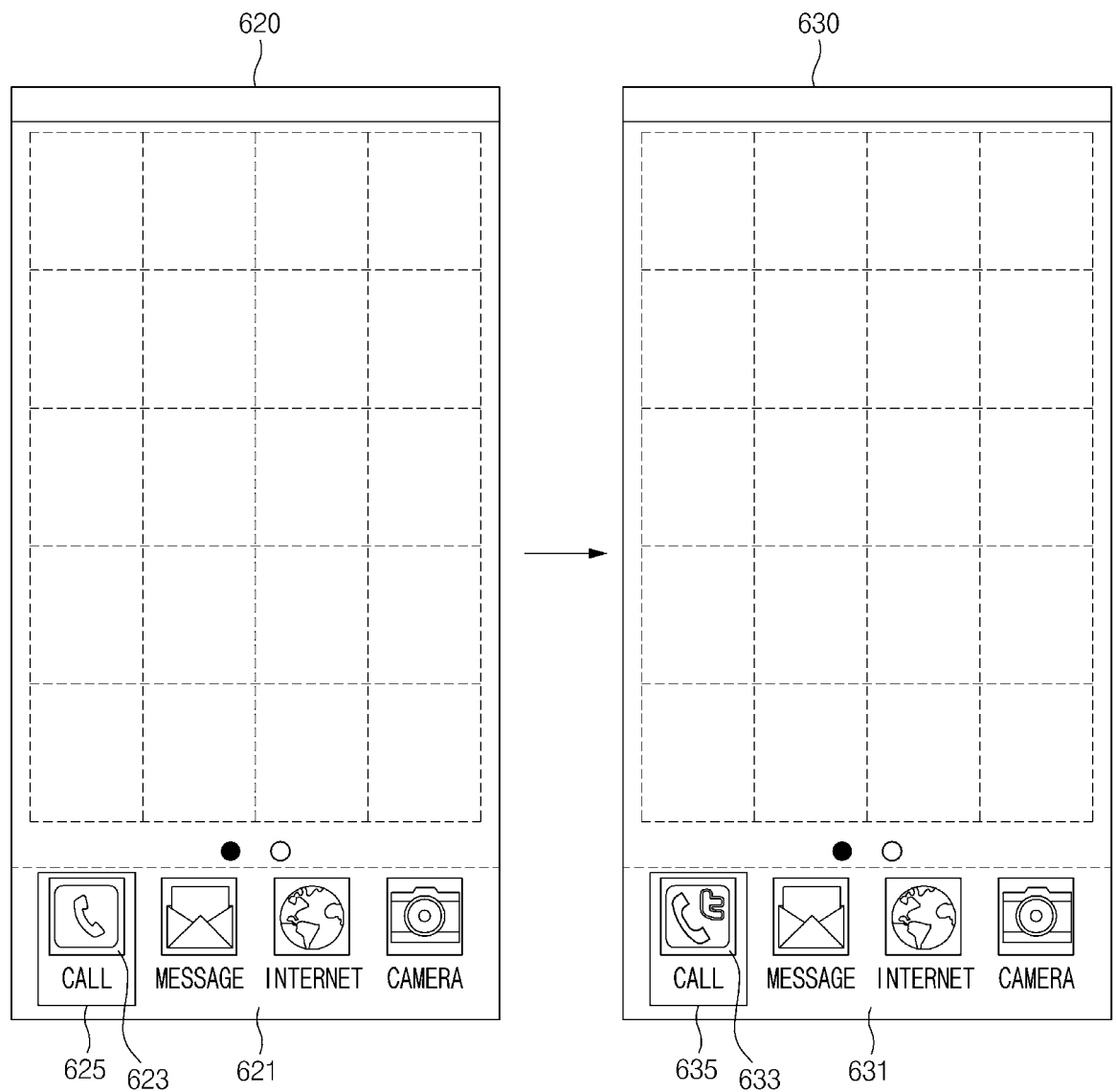
FIG. 6B exemplarily illustrates a screen layout displayed based on data obtained by at least partially changing backup data, according to various embodiments.

FIG. 6B exemplarily illustrates a screen layout displayed based on data obtained by at least partially changing backup data, according to various embodiments.

Referring to FIG. 6B, a first screen 620 corresponding to a first page of a home screen of an external electronic device is exemplarily illustrated. The first screen 620 corresponding to the first page of the home screen of the external electronic device may contain a region 621 in which an icon is fixedly displayed without being changed when the page is changed (e.g., the region 430 in which the icon is fixedly displayed in FIG. 4A).

Referring to FIG. 6B, based on data obtained by at least partially changing received backup data, a second screen 630 corresponding to a first page of a home screen of an electronic device displayed on a display is exemplarily illustrated. The second screen 630 corresponding to the first page of the home screen of the electronic device may contain a region 631 in which an icon is fixedly displayed without being changed when the page is changed (e.g., the region 430 in which the icon is fixedly displayed in FIG. 4A).

In various embodiments, the external electronic device may be in a state in which a third application is set as a default application among the third application and a fourth application performing a call function. The external electronic device may cause a first icon 623 indicating the third application to be located (or displayed) at a first location 625 of the region 621 in which the icon is fixedly displayed of the home screen.

According to various embodiments, the electronic device may receive the backup data from the external electronic device.

In various embodiments, the backup data may contain information related to an application installed in the external electronic device. For example, the information related to the application installed in the external electronic device may include information identifying the call application (e.g., the third application) installed in the external electronic device.

In various embodiments, the backup data may contain information related to a screen layout corresponding to the first screen 620. For example, the information related to the screen layout may include location information indicating the location (e.g., the first location 625) of the icon (e.g., the first icon 623) of the application installed in the external electronic device. For example, the information related to the screen layout may include location information indicating at which location on the home screen the icon of the application installed in the external electronic device is located. The above-described location information may be implemented using coordinate values along a first axis (e.g., an x-axis) and a second axis (e.g., a y-axis) substantially perpendicular to the first axis.

According to various embodiments, the electronic device may receive backup data corresponding to the first screen 620 from the external electronic device, and at least partially change the backup data based on the characteristics of the electronic device. According to various embodiments, the electronic device may be in the state in which the fourth application is set as the default application among the third application and the fourth application performing the call function.

According to various embodiments, the electronic device may at least partially change the backup data received from the external electronic device to cause the user to easily recognize the fourth application set as the default application of the electronic device. According to various embodiments, the electronic device may at least partially change information related to the screen layout corresponding to the first screen 620 to generate information (e.g., the second data) related to the screen layout corresponding to the second screen 630. The electronic device may perform the restoring operation using the generated information related to the screen layout corresponding to the second screen 630.

According to various embodiments, the electronic device may configure the screen layout that displays the icon of the application to correspond to the characteristics of the electronic device by at least partially changing the backup data received from the external electronic device. According to various embodiments, the electronic device may display a second icon 633 of the fourth application at a location 635 having the same location information as location information indicating the first location 625 on the first screen 620 of the external electronic device. In various embodiments, the electronic device may perform a restoring operation based on the characteristics of the electronic device, thereby displaying an icon (e.g., the second icon 633) of the fourth application at the location 635 on the second screen 630 the same or substantially the same as the first location 625 on the first screen 620. The electronic device may provide the user with the new use experience based on the characteristics of the electronic device.

Figure 7:
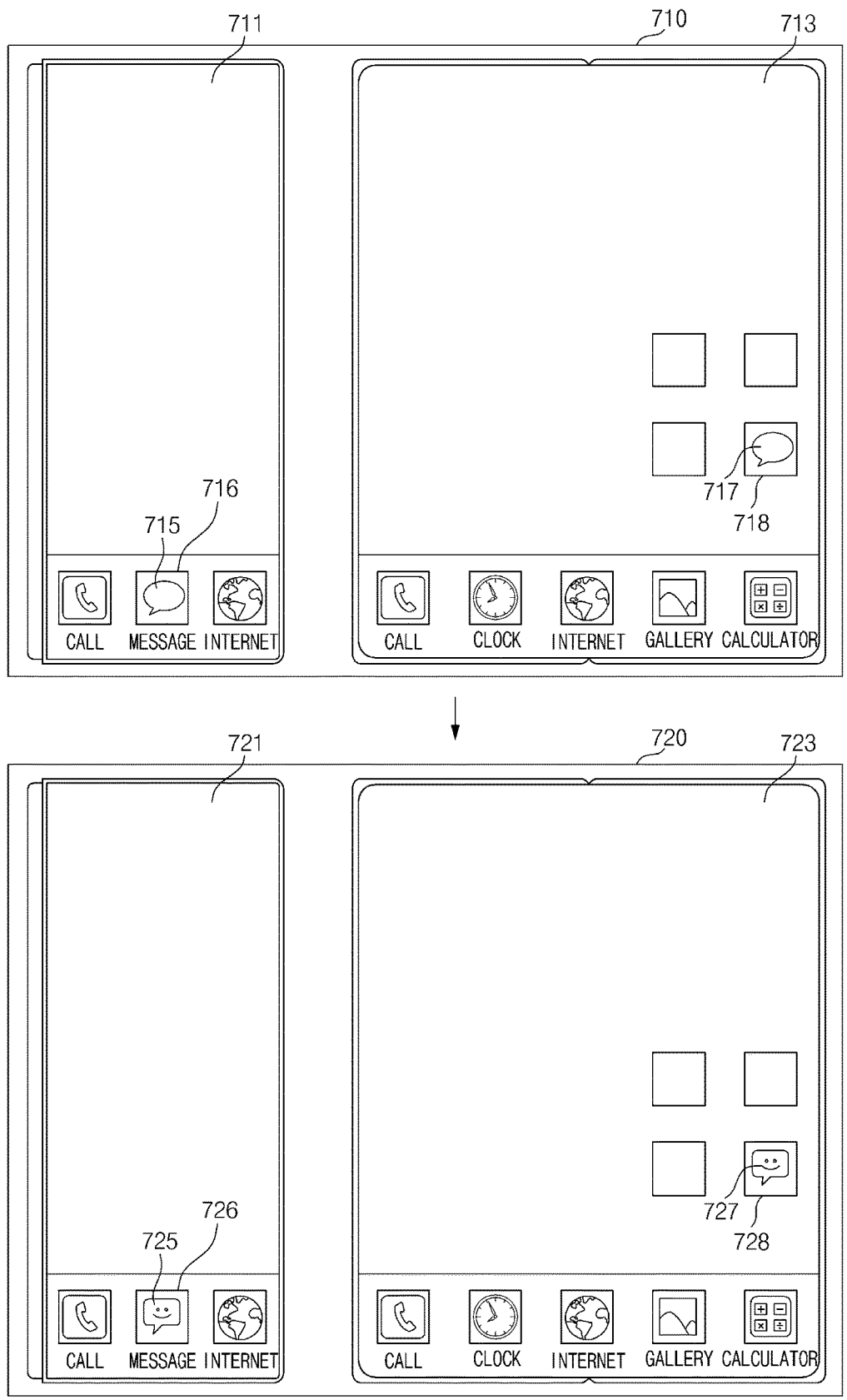
FIG. 7 illustrates a diagram for illustrating an embodiment in which an electronic device configures screen layouts of a plurality of displays during a restoring operation based on backup data received from an external electronic device and characteristics of the electronic device, according to various embodiments.

FIG. 7 illustrates a diagram for illustrating an embodiment in which an electronic device configures screen layouts of a plurality of displays during a restoring operation based on backup data received from an external electronic device and characteristics of the electronic device, according to various embodiments. The above-described various embodiments regarding the restoring operation performed based on the backup data received from the external electronic device and the characteristics of the electronic device may be equally or similarly applied to a following electronic device including a plurality of displays.

Referring to FIG. 7, a first display 711 that is exposed to the outside in a folded state of an external electronic device 710 (e.g., the external electronic devices 102 and 104 in FIG. 1 or the external electronic device 202 in FIG. 2) and a second display 713 that is exposed to the outside in an unfolded state are illustrated. For example, when the external electronic device 710 corresponds to a foldable electronic device, the external electronic device 710 may include the first display 711 that is exposed to the outside in the folded state and the second display 713 that is exposed to the outside in the unfolded state. For example, the second display 713 may not be exposed to the outside when the external electronic device 710 is in the folded state.

Referring to FIG. 7, a third display 721 that is exposed to the outside in a folded state of an electronic device 720 (e.g., the electronic device 101 in FIG. 1, the electronic device 201 in FIG. 2, or the electronic device 301 in FIG. 3) and a fourth display 723 that is exposed to the outside in an unfolded state are illustrated. For example, when the electronic device 720 corresponds to a foldable electronic device, the electronic device 720 may include the third display 721 that is exposed to the outside in the folded state and the fourth display 723 that is exposed to the outside in the unfolded state. For example, the fourth display 723 may not be exposed to the outside when the electronic device 720 is in the folded state.

In various embodiments, the electronic device 720 may receive backup data from the external electronic device 710, and may individually configure the screen layouts of the plurality of displays based on the received backup data and the characteristics of the electronic device during the restoring operation.

According to various embodiments, the external electronic device 710 may be in a state in which a first application is set as a default application among the first application and a second application performing a message transmission and reception function. According to various embodiments, the electronic device 720 may be in a state in which the second application is set as the default application among the first application and the second application performing the message transmission and reception function.

According to various embodiments, the external electronic device 710 may have a screen layout in which a first icon 715 indicating the first application is located at a first location 716 of the first display 711 and a second icon 717 indicating the first application is located at a second location 718 of the second display 713.

According to various embodiments, the electronic device 720 may receive the backup data from the external electronic device 710.

In various embodiments, the backup data may contain information related to an application installed in the external electronic device 710. For example, the information related to the application installed in the external electronic device 710 may include information identifying the first application installed in the external electronic device 710.

In various embodiments, the backup data may contain information related to a screen layout corresponding to a screen of the first display 711 and a screen layout corresponding to a screen of the second display 713. For example, the information related to the screen layout may include location information indicating the first location 716 of the first icon 715 of the first application on the first display 711. For example, the information related to the screen layout may include location information indicating the second location 718 of the second icon 717 of the second application on the second display 713. For example, the information related to the screen layout may include location information indicating at which location the icon of the application installed in the external electronic device 710 is located. The above-described location information may be implemented using coordinate values along a first axis (e.g., an x-axis) and a second axis (e.g., a y-axis) substantially perpendicular to the first axis. For example, the first icon 715 and the second icon 717 of the first application may mean substantially the same icon (or the same icon form).

According to various embodiments, the electronic device 720 may receive the backup data containing the information related to the screen layouts corresponding to the first display 711 and the second display 713 of the external electronic device 710 from the external electronic device 710, and at least partially change the backup data based on the characteristics of the electronic device 720.

According to various embodiments, the electronic device 720 may at least partially change the backup data received from the external electronic device 710 to cause the user to easily recognize the second application set as the default application of the electronic device 720. According to various embodiments, the electronic device 720 may perform the restoring operation by distinguishing the displays (e.g., the first display 711 and the third display 721) exposed in the folded state and the displays (e.g., the second display 713 and the fourth display 723) exposed in the unfolded state from each other.

According to various embodiments, the electronic device 720 may configure a screen layout of the third display 721 using the backup data related to the first display 711 of the external electronic device 710, and may configure a screen layout of the fourth display 723 using the backup data related to the second display 713 of the external electronic device 710.

According to various embodiments, the electronic device 720 may at least partially change the information related to the screen layout corresponding to the first display 711 to generate information (e.g., second data) related to the screen layout corresponding to the third display 721. The electronic device 720 may perform the restoring operation using the generated information related to the screen layout corresponding to the third display 721. According to various embodiments, the electronic device 720 may at least partially change the information related to the screen layout corresponding to the second display 713 to generate information related to the screen layout corresponding to the fourth display 723. The electronic device 720 may perform the restoring operation using the generated information related to the screen layout corresponding to the fourth display 723.

According to various embodiments, the electronic device 720 may at least partially change the backup data received from the external electronic device 710 to configure a screen layout that displays an icon of an application to correspond to characteristics of the electronic device 720. According to various embodiments, the electronic device 720 may display a third icon 725 of the second application at a location 726 having the same location information as location information indicating the first location 716 on the first display 711 of the external electronic device 710. According to various embodiments, the electronic device 720 may display a fourth icon 727 of the second application at a location 728 having the same location information as location information indicating the second location 718 on the second display 713 of the external electronic device 710. For example, the third icon 725 and the fourth icon 727 of the second application may mean substantially the same icon (or the same icon form). In various embodiments, the electronic device 720 may perform the restoring operation individually for the displays when performing the restoring operation based on the characteristics (e.g., the default application) of the electronic device 720 to provide the user with a new use experience based on the characteristics of the electronic device 720.

Figure 8A:
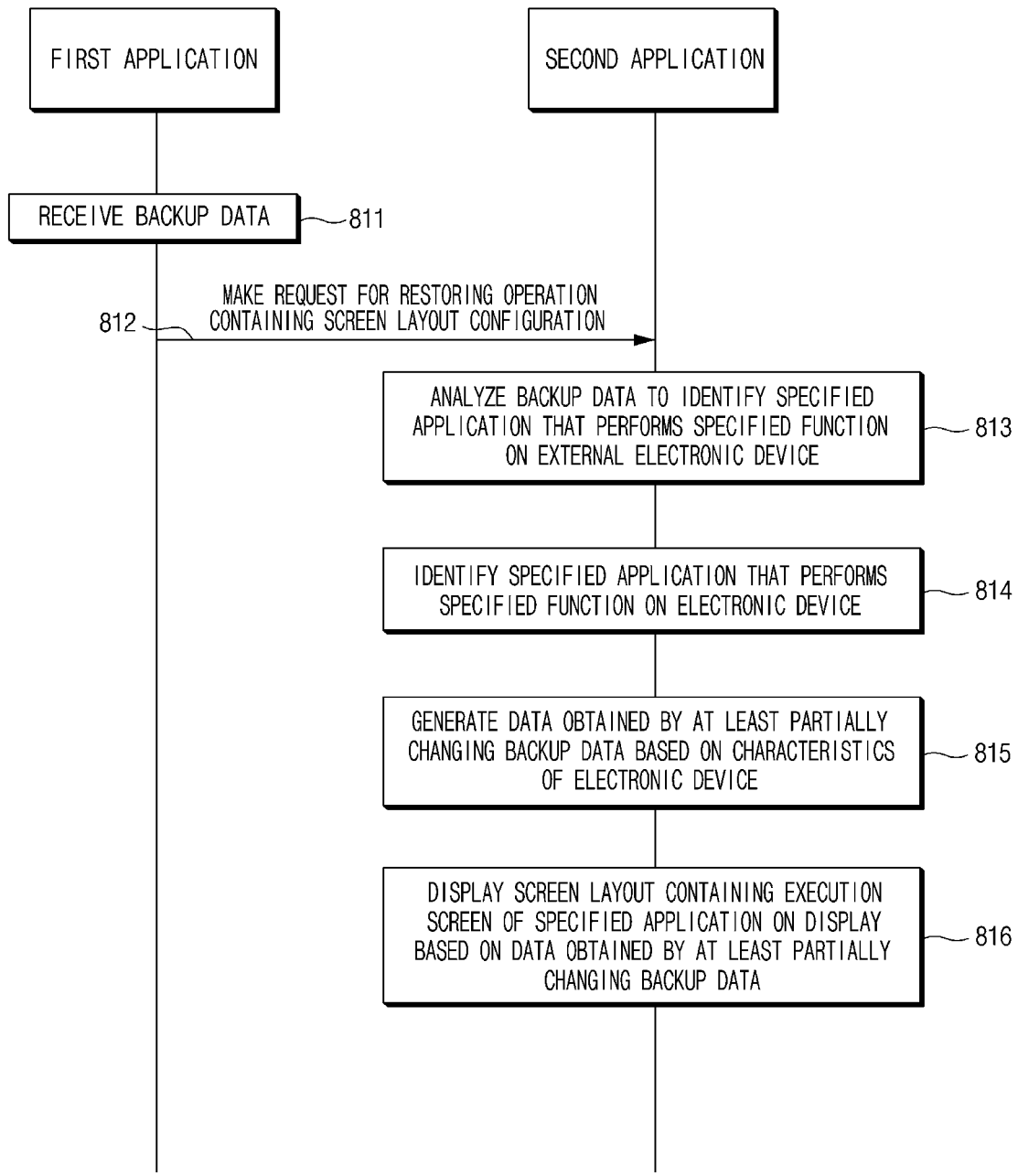
FIG. 8A illustrates a flowchart illustrating that an electronic device configures a screen layout containing an execution screen of a specified application that performs a specified function during a restoring operation and displays the configured screen layout on a display, according to various embodiments.

FIG. 8A illustrates a flowchart illustrating that an electronic device configures a screen layout containing an execution screen of a specified application that performs a specified function during a restoring operation and displays the configured screen layout on a display, according to various embodiments. Hereinafter, operations described as being performed by an electronic device (e.g., the electronic device 101 in FIG. 1, the electronic device 201 in FIG. 2, the electronic device 301 in FIG. 3, or the electronic device 720 in FIG. 7) may be understood as being performed by a processor (e.g., the processor 120 in FIG. 1 or the processor 330 in FIG. 3).

According to various embodiments, in operation 811, the electronic device may use a first application to receive backup data from an external electronic device (e.g., the external electronic devices 102 and 104 in FIG. 1, the external electronic device 202 in FIG. 2, or the external electronic device 710 in FIG. 7). For example, the first application may perform a function of moving data (e.g., the backup data) between different electronic devices. For example, the backup data may be referred to as first data.

According to various embodiments, in operation 812, the electronic device may make a request for a restoring operation containing screen layout configuration to a second application using the first application. For example, the second application may correspond to a launcher application that sets an operation environment of the electronic device.

According to various embodiments, in operation 813, the electronic device may analyze the backup data using the second application to identify a specified application that performs a specified function on the external electronic device. In various examples, the electronic device may recognize that the external electronic device does not support the specified function by analyzing the backup data.

In various embodiments, the specified application may be an application configured such that an execution screen of the specified application is displayed on an entirety of a specified page of a home screen. For example, the specified application may be configured to display the set execution screen of the specified application on an entirety of a page of a top priority among a plurality of pages of the home screen. For example, the specified application may perform a specified function of displaying an execution screen containing at least one of user interest information, weather information, and news on the entirety the page of the top priority among the plurality of pages of the home screen.

According to various embodiments, the external electronic device may be in a state (or in an activated state) in which an execution screen of a third application among the third application and a fourth application performing the specified function is set to be displayed on the entirety of the page of the top priority. In another example, the external electronic device may be in a state (or in an inactive state) in which execution screens of both of the third application and the fourth application performing the specified function are not set to be displayed on the entirety of the page of the top priority.

According to various embodiments, in operation 814, the electronic device may identify the specified application that performs the specified function of the electronic device using the second application. According to various embodiments, the electronic device may identify that the fourth application is installed among the third application and the fourth application performing the specified function. In various embodiments, the electronic device may recognize that the third application and the fourth application performing the specified function are installed, and the fourth application among the third application and the fourth application is set as a default application According to various embodiments, in operation 815, using the second application, the electronic device may generate data obtained by at least partially changing the backup data based on the characteristics (e.g., a type of the application that performs the specified function or the default application that performs the specified function) of the electronic device. For example, the data obtained by at least partially changing the backup data may be referred to as the second data.

According to various embodiments, in operation 816, using the second application, the electronic device may execute the specified application based on the data (e.g., the second data) obtained by at least partially changing the backup data, and display a screen layout containing the execution screen of the specified application on the display. For example, the electronic device may recognize that the external electronic device is in the state in which the execution screen of the third application is set to be displayed on the entirety of the page of the top priority based on the backup data. The electronic device may execute the fourth application instead of the third application by at least partially changing the backup data, and display the execution screen of the fourth application on the entirety of the specified page of the home screen. In another example, the electronic device may recognize, based on the backup data, that the external electronic device is in the state (e.g., the state in which the external electronic device does not support the specified function) in which the execution screens of both of the third application and the fourth application are not set to be displayed on the entirety of the page of the top priority. The electronic device may at least partially change the backup data to execute the fourth application and display the execution screen of the fourth application on the entirety of the specified page of the home screen. According to various embodiments, the electronic device may perform a specified function of displaying the execution screen of the fourth application on the entirety of the specified page of the home screen during the restoring operation to provide the user with a new use experience that is different from a use experience of the external electronic device.

Figure 8B:
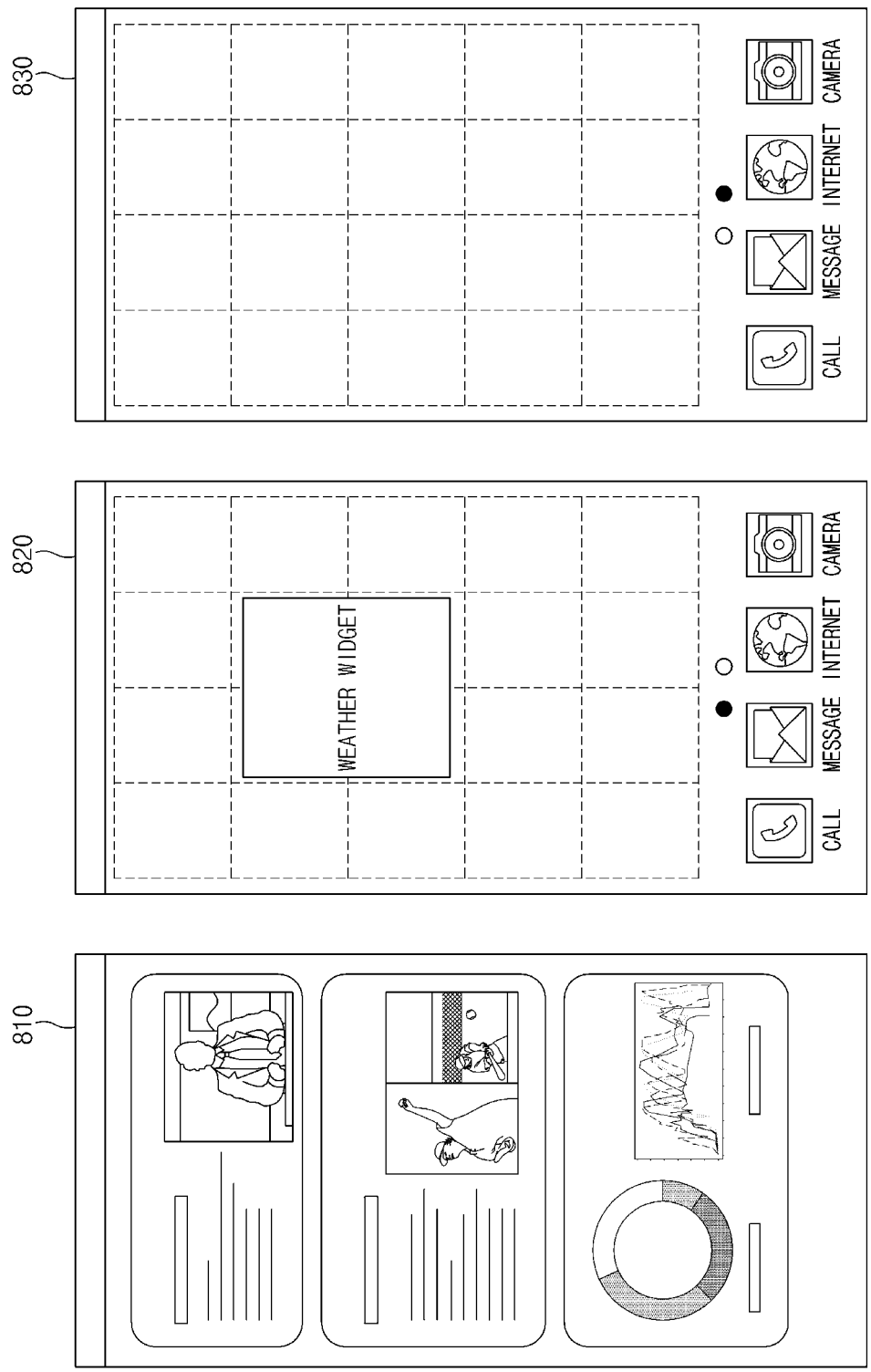
FIG. 8B exemplarily illustrates an execution screen of a specified application that performs a specified function, according to various embodiments.

FIG. 8B exemplarily illustrates an execution screen of a specified application that performs a specified function, according to various embodiments.

FIG. 8B illustrates a plurality of pages 810, 820, and 830 of a home screen of an electronic device.

According to various embodiments, the electronic device may execute a specified application configured such that an execution screen of the application is displayed on an entirety of a specified page of the home screen. For example, the specified application may be configured to display the execution screen on an entirety of a page 810 of a top priority among the plurality of pages 810, 820, and 830 of the home screen. For example, the specified application may perform a specified function of displaying the execution screen containing at least one of user interest information, weather information, and news on the entirety of the page 810 of the top priority among the plurality of pages 810, 820, and 830 of the home screen.

An electronic device (e.g., the electronic device 101 in FIG. 1, the electronic device 201 in FIG. 2, the electronic device 301 in FIG. 3, or the electronic device 720 in FIG. 7) according to various embodiments of the disclosure may include a display (e.g., the display module 160 in FIG. 1, the display 310 in FIG. 3, the third display 721 or the fourth display 723 in FIG. 7), a memory (e.g., the memory 130 in FIG. 1 or the memory 320 in FIG. 3), and a processor (e.g., the processor 120 in FIG. 1 or the processor 330 in FIG. 3) operatively connected to the display and the memory. According to various embodiments, the memory may store instructions that, when executed, cause the processor to receive backup data from an external electronic device (e.g., the external electronic devices 102 and 104 in FIG. 1, the external electronic device 202 in FIG. 2, or the external electronic device 710 in FIG. 7), identify characteristics of the external electronic device based on the backup data, identify characteristics of the electronic device based on the backup data, at least partially change the backup data based on the characteristics of the electronic device, and display a result of performing a restoring operation based on the at least partially changed backup data on the display.

According to various embodiments, the instructions may cause the processor to identify a first application installed in the external electronic device to perform a first specified function based on the backup data.

According to various embodiments, the instructions may cause the processor to identify a second application installed in the electronic device to perform the first specified function based on the backup data.

According to various embodiments, the instructions may cause the processor to obtain first location information indicating a first location where a first icon indicating the first application is displayed based on the backup data, and at least partially change the backup data such that a second icon indicating the second application is displayed at a second location on a screen displayed on the display, corresponding to the first location.

According to various embodiments, the instructions may cause the processor to perform the restoring operation of displaying the second icon at the second location of the screen displayed on the display.

According to various embodiments, the instructions may cause the processor to perform the restoring operation of displaying the second icon at the second location of the screen displayed on the display, and displaying the first icon in a specified folder of the screen.

According to various embodiments, the backup data may contain information related to a screen layout of the external electronic device.

According to various embodiments, the instructions may cause the processor to identify a default application of performing a first specified function of the electronic device based on the backup data, and the first specified function may include at least one of a message transmission and reception function and a call function.

According to various embodiments, the instructions may cause the processor to perform the restoring operation of determining whether the external electronic device supports a second specified function based on the backup data, identifying a third application executed by the electronic device to perform the second specified function based on the backup data, and executing the third application.

According to various embodiments, the second specified function may include a function of displaying an execution screen of an application on an entirety of a page of a top priority among a plurality of pages of a home screen.

According to various embodiments, the execution screen of the application may contain at least one of user interest information, weather information, and news.

Figure 9:
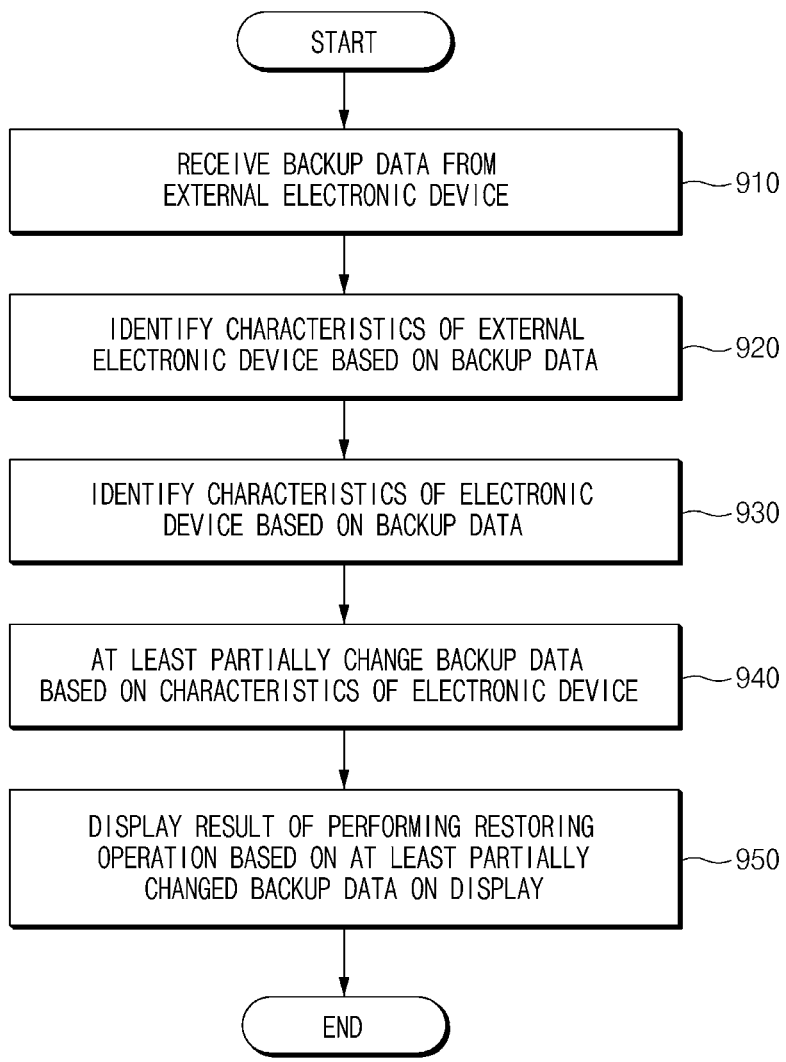
FIG. 9 illustrates a flowchart of an operation method of an electronic device, according to various embodiments.

FIG. 9 illustrates a flowchart of an operation method of an electronic device, according to various embodiments.

Hereinafter, operations described as being performed by an electronic device (e.g., the electronic device 101 in FIG. 1, the electronic device 201 in FIG. 2, the electronic device 301 in FIG. 3, or the electronic device 720 in FIG. 7) may be understood as being performed by a processor (e.g., the processor 120 in FIG. 1 or the processor 330 in FIG. 3).

According to various embodiments, in operation 910, the electronic device may receive backup data from an external electronic device (e.g., the external electronic devices 102 and 104 in FIG. 1, the external electronic device 202 in FIG. 2, or the external electronic device 710 in FIG. 7).

According to various embodiments, in operation 920, the electronic device may identify characteristics of the external electronic device based on the backup data. According to various embodiments, the electronic device may identify an application that is installed in the external electronic device and performs a specified function (e.g., a message transmission and reception function or a call function) based on the backup data. According to various embodiments, the electronic device may recognize a screen layout of the external electronic device based on the backup data. According to various embodiments, the electronic device may determine whether the external electronic device supports the specified function, based on the backup data.

According to various embodiments, in operation 930, the electronic device may identify characteristics of the electronic device based on the backup data. In various embodiments, the electronic device may identify a default application that performs the specified function and/or determine whether the specified function is supported.

According to various embodiments, in operation 940, the electronic device may at least partially change the backup data based on the characteristics of the electronic device. For example, a first application that performs the specified function in the external electronic device and a second application that performs the specified function in the electronic device may be different from each other. In various embodiments, the electronic device may at least partially change the backup data such that a user may easily recognize the second application after a restoring operation.

According to various embodiments, in operation 950, the electronic device may display a result of performing the restoring operation based on the at least partially changed backup data on a display (e.g., the display module 160 in FIG. 1, the display 310 in FIG. 3, or the third display 721 or the fourth display 723 in FIG. 7) of the electronic device. For example, the electronic device may configure a screen layout of the display based on the at least partially changed backup data.

An operation method of an electronic device (e.g., the electronic device 101 in FIG. 1, the electronic device 201 in FIG. 2, the electronic device 301 in FIG. 3, or the electronic device 720 in FIG. 7) according to various embodiments of the disclosure may include receiving backup data from an external electronic device (e.g., the external electronic devices 102 and 104 in FIG. 1, the external electronic device

202 in FIG. 2, or the external electronic device 710 in FIG. 7), identifying characteristics of the external electronic device based on the backup data, identifying characteristics of the electronic device based on the backup data, at least partially changing the backup data based on the characteristics of the electronic device, and displaying a result of performing a restoring operation based on the at least partially changed backup data on a display (e.g., the display module 160 in FIG. 1, the display 310 in FIG. 3, or the third display 721 or the fourth display 723 in FIG. 7) of the electronic device.

According to various embodiments, the identifying of the characteristics of the external electronic device may include identifying a first application installed in the external electronic device to perform a first specified function based on the backup data.

According to various embodiments, the identifying of the characteristics of the electronic device may include identifying a second application performing the first specified function based on the backup data.

According to various embodiments, the at least partial changing of the backup data may include obtaining first location information indicating a first location where a first icon indicating the first application is displayed based on the backup data, and at least partially changing the backup data such that a second icon indicating the second application is displayed at a second location on a screen displayed on the display, corresponding to the first location.

According to various embodiments, the displaying of the result of performing the restoring operation on the display of the electronic device may include displaying the second icon at the second location of the screen displayed on the display.

According to various embodiments, the displaying of the result of performing the restoring operation on the display of the electronic device may include displaying the second icon at the second location of the screen displayed on the display, and displaying the first icon in a specified folder of the screen.

According to various embodiments, the backup data may contain information related to a screen layout of the external electronic device.

According to various embodiments, the identifying of the characteristics of the electronic device may include identifying a default application of performing a first specified function of the electronic device based on the backup data, and the first specified function may include at least one of a message transmission and reception function and a call function.

According to various embodiments, the identifying of the characteristics of the external electronic device may include determining whether the external electronic device supports a second specified function based on the backup data, the identifying of the characteristics of the electronic device may include identifying a third application executed by the electronic device to perform the second specified function based on the backup data, and the displaying of the result of performing the restoring operation on the display of the electronic device may include performing the third application.

According to various embodiments, the second specified function may include a function of displaying an execution screen of an application on an entirety of a page of a top priority among a plurality of pages of a home screen.

According to various embodiments, the execution screen of the application may contain at least one of user interest information, weather information, and news.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display;
a memory; and
a processor operatively connected to the display and the memory,
wherein the memory stores instructions that, when executed, cause the processor to:
receive backup data from an external electronic device;
identify characteristics of the external electronic device based on the backup data;
identify characteristics of the electronic device based on the backup data;
at least partially change the backup data based on the characteristics of the electronic device; and
display a result of performing a restoring operation based on the at least partially changed backup data on the display.

2. The electronic device of claim 1, wherein the instructions cause the processor to identify a first application installed in the external electronic device to perform a first specified function based on the backup data.

3. The electronic device of claim 2, wherein the instructions cause the processor to identify a second application installed in the electronic device to perform the first specified function based on the backup data.

4. The electronic device of claim 3, wherein the instructions cause the processor to:
obtain first location information indicating a first location where a first icon indicating the first application is displayed based on the backup data; and
at least partially change the backup data such that a second icon indicating the second application is displayed at a second location on a screen displayed on the display, corresponding to the first location.

5. The electronic device of claim 4, wherein the instructions cause the processor to perform the restoring operation of displaying the second icon at the second location of the screen displayed on the display.

6. The electronic device of claim 4, wherein the instructions cause the processor to perform the restoring operation of:
displaying the second icon at the second location of the screen displayed on the display; and
displaying the first icon in a specified folder of the screen.

7. The electronic device of claim 1, wherein the backup data contains information related to a screen layout of the external electronic device.

8. The electronic device of claim 1, wherein the instructions cause the processor to identify a default application of performing a first specified function of the electronic device based on the backup data,
wherein the first specified function includes at least one of a message transmission and reception function and a call function.

9. The electronic device of claim 1, wherein the instructions cause the processor to perform the restoring operation of:
determining whether the external electronic device supports a second specified function based on the backup data;
identifying a third application executed by the electronic device to perform the second specified function based on the backup data; and
executing the third application.

10. The electronic device of claim 9, wherein the second specified function includes a function of displaying an execution screen of an application on an entirety of a page of a top priority among a plurality of pages of a home screen.

11. An operation method of an electronic device, the method comprising:
receiving backup data from an external electronic device;
identifying characteristics of the external electronic device based on the backup data;
identifying characteristics of the electronic device based on the backup data;
at least partially changing the backup data based on the characteristics of the electronic device; and
displaying a result of performing a restoring operation based on the at least partially changed backup data on a display of the electronic device.

12. The method of claim 11, wherein the identifying of the characteristics of the external electronic device includes:
identifying a first application installed in the external electronic device to perform a first specified function based on the backup data.

13. The method of claim 12, wherein the identifying of the characteristics of the electronic device includes:
identifying a second application performing the first specified function based on the backup data.

14. The method of claim 13, wherein the at least partial changing of the backup data includes:

obtaining first location information indicating a first location where a first icon indicating the first application is displayed based on the backup data; and at least partially changing the backup data such that a second icon indicating the second application is displayed at a second location on a screen displayed on the display, corresponding to the first location.

15. The method of claim 14, wherein the displaying of the result of performing the restoring operation on the display of the electronic device includes:

displaying the second icon at the second location of the screen displayed on the display.

16. The method of claim 14, wherein the displaying of the result of performing the restoring operation on the display of the electronic device includes:

displaying the second icon at the second location of the screen displayed on the display; and displaying the first icon in a specified folder of the screen.

17. The method of claim 11, wherein the backup data contains information related to a screen layout of the external electronic device.

18. The method of claim 11, wherein the identifying of the characteristics of the electronic device includes:

identifying a default application of performing a first specified function of the electronic device based on the backup data, wherein the first specified function includes at least one of a message transmission and reception function and a call function.

19. The method of claim 11, wherein the identifying of the characteristics of the external electronic device includes:

determining whether the external electronic device supports a second specified function based on the backup data, wherein the identifying of the characteristics of the electronic device includes:

identifying a third application executed by the electronic device to perform the second specified function based on the backup data, wherein the displaying of the result of performing the restoring operation on the display of the electronic device includes:

performing the third application.

20. The method of claim 19, wherein the second specified function includes a function of displaying an execution screen of an application on an entirety of a page of a top priority among a plurality of pages of a home screen.

* * * * *